United States Patent
Rust et al.

[11] Patent Number: 6,054,148
[45] Date of Patent: Apr. 25, 2000

[54] METHOD AND COMPOSITIONS FOR ENSILING SILAGE

[75] Inventors: Steven R. Rust, Mason; Melvin T. Yokoyama, East Lansing, both of Mich.; Tadd E. Dawson, Silver Springs, Md.

[73] Assignee: Board of Trustees operating Michigan State University, East Lansing, Mich.

[21] Appl. No.: 09/245,017

[22] Filed: Feb. 4, 1999

Related U.S. Application Data

[63] Continuation of application No. 08/994,639, Dec. 19, 1997, abandoned.

[51] Int. Cl.$^7$ .............................. A23K 1/00; A23B 7/10
[52] U.S. Cl. .................................. 426/2; 426/54; 426/61; 426/635; 426/807; 424/438
[58] Field of Search .......................... 426/2, 635, 623, 426/54, 61, 807; 424/93.1, 93.3, 93.4, 438; 435/252.9, 243

[56] References Cited

U.S. PATENT DOCUMENTS

| | | | |
|---|---|---|---|
| 4,528,199 | 7/1985 | Moon et al. | 426/53 |
| 4,842,871 | 6/1989 | Hill | 426/44 |
| 4,981,705 | 1/1991 | Tomes . | |
| 4,983,406 | 1/1991 | Ayres et al. | 426/9 |
| 5,432,074 | 7/1995 | Evans et al. | 435/200 |
| 5,529,793 | 6/1996 | Garner et al. . | |
| 5,534,271 | 7/1996 | Ware et al. . | |
| 5,639,659 | 6/1997 | Barefoot et al. | 435/252.1 |
| 5,747,020 | 5/1998 | Rutherford et al. | 424/93.45 |

FOREIGN PATENT DOCUMENTS 0 071 858  2/1983  European Pat. Off. .

OTHER PUBLICATIONS

Muck, R.E., J. Dairy Sci. 71:2992 (1988).
Woolford, M.K., J. Appl. Bacteriol. 68:101 (1990).
Ruxton, G.D., et al., J. Sci. Food Agric 62:209 (1993).
Lindgren, S., et al., J. Sci. Food Agric 36:765 (1985).
Lindgren, S., et al., Swed. J. Of Agric. Res. 13:91 (1983).
Rust, S.R., et al., J. prod. Agric. 2:235–241 (1989).
Phillip, L.E., et al., J. Anim. Sci. 70:3178–3187 (1992).
Sanderson, M.A., J. Anim. Sci. 71:505–514 (1993).
Wardynski, et al., J. Anim. Sci. 71–2246 (1993).
Jones, G.M., et al., Can. J. Anim. Sci 54:499 (1974).
Britt, D.G., et al., J. Dairy Sci. 58:532 (1975).
Hara, S., et al., Jap. J. Zootech. Sci. 50:288 (1979).
Raeker, et al., in Cereal Chem. 69(1):66–69 (1992).
Woskow, et al., Applied and Environmental Microbio. 57:2821–2828 (1991).
Dawson, et al., Abstract 21st Biennial Conf. on Rumen Function, Chicago, ILL. (1991).
Woolford, et al., J. Applied. Bact. 39:301–306 (1975).
Flores–Galarza, J. Food Protection 48:407–411 (1985).
Wardynski, F.A., Effects of Microbial Cultures and Various Other Additives . . . M.S. Thesis, MSU, East Lansing, MI (1991).
Spoelstra, S.R., et al., J. Agric. Sci 111:127 (1988).
Canale, A., et al., J. Sci. Food Agric. 35:1178–1182 (1984).
Rust, S.R., et al., J. Prod. Agric. 5:454 (1992).
Hettinga and Reinbold, J. Milk Food Technol, 35:295–301 (1972).
Faber, D.A., et al., J. Dairy Sci. 71:1234–1242 (1989).
Liu and Moon, App. Environ. Microbiol 44:715–722 (1982).
Parker and Moon, J. Food Prot. 45:326 (1982).
Javainen and Linko, J. Cereal Sci. 18:75–88 (1993).
Perez–Chaia et al., J. Appl. Back. 77:134–139 (1994).

*Primary Examiner*—Nina Bhat
*Attorney, Agent, or Firm*—Ian C. McLeod

[57] ABSTRACT

*Propionibacterium acidipropionici* DH42 for ensiling silage and in particular high moisture corn is described. The resulting silage has improved nutrient values from ensiling and aerobic stability.

13 Claims, 9 Drawing Sheets

METHOD AND COMPOSITIONS FOR ENSILING SILAGE

This application is a continuation of application(s) application Ser. No. 08/994,639 filed on Dec. 19, 1997 abandoned.

BACKGROUND OF THE INVENTION (1) Field of the Invention

The present invention relates to a method for ensiling silage and in particular high moisture corn using a unique strain *Propionibacterium acidipropionici* DH42 alone or in admixture with lactic acid bacteria. In particular, the present invention relates to a method which produces improved nutrient values in ensiling and when the silage is exposed to aerobic conditions upon removal from the silo.

(2) Description of Related Art

Aerobic deterioration of ensiled feeds is detrimental to the production of livestock feeds for many reasons (Muck, R. E., J. Dairy Sci. 71:2992 (1988); is and Pitt, R. E., Silage and Hay Preservation. Ithaca, N.Y. Northeast Regional Engineering Service NRAES-5 (1990)). Aerobic microorganisms such as yeasts, molds and certain bacteria metabolize the highly-digestible fraction of the dry matter and can account for losses of dry matter in excess of 30% (Woolford, M. K., J. Appl. Bacteriol. 68:101 (1990)). In addition, microbial activity associated with aerobic deterioration can increase the temperature of the feed and generate feed that is less palatable and reduced digestibility (Ruxton, G. D., et al., J. Sci. Food Agric. 62:209 (1993)). Propionic acid has been used quite successfully in reducing losses associated with aerobic instability (Lindgren, S., et al., J. Sci. Food Agric. 36:765 (1985)). Flores-Galarza and coworkers (Flores-Galarza, R., et al., J. Food Prot. 48:467 (1985)) added strains of propionic acid-producing bacteria commonly found in cheese and decreased proliferation of yeasts and molds associated with high-moisture corn. However, Lindgren and coworkers (Lindgren, S., et al., Swed. J. Of Agric. Res. 13:91 (1983)) were unsuccessful in manipulating the fermentation of grass silage by the addition of *P. shermanii*.

In recent years, ensiling high moisture corn (HMC) has gained wide acceptance for several reasons. Ensiling eliminates the added cost of drying and the corn can be harvested two (2) to three (3) weeks earlier, thereby reducing field losses. If corn is harvested at 24–30% moisture content, dry matter loss can be reduced by 3–8% (Huber, J. T., Anim. Nutr. Health 34:6–8 (1982)). If properly stored, high moisture corn has the same feeding value, if not better, than dry corn (Hellevang and Morey, Energy Conservation and Alternative Energy Source for Corn Dyring. Nat. Corn Hand. Cooperative Extension Service 1985). However, if high moisture corn is not properly ensiled, spoilage due to microbial metabolism could occur.

Silage additives such as bacterial inoculants, acids and enzymes have been developed to improve fermentation and reduce spoilage. With the addition of lactic acid-producing bacterial inoculants, lactic acid concentration and dry matter recovery are increased. However, the stability of the ensiled material once the silos are opened has been inconsistent (Rust, S. R., et al., J. Prod. Agric. 2:235–241 (1989); Phillip, L. E., et al., J. Anim. Sci. 70:3178–3187 (1992); Sanderson, M. A., J. Anim. Sci. 71:505–514 (1993); Wardynski et al, J. Anim. Sci. 71:2246 (1993)).

Thus the prior art has described the use of various species of Lactobacillus and/or Propionibacterium to ensile various plant materials, particularly corn. Illustrative is U.S. Pat. No. 4,981,705 to Tomes; Dawson et al Abstract 21st Biennial Conference on Rumen Function, Chicago, Ill. (1991); Woolford et al, J. Applied Bact. 39:301–306 (1975) and Flores-Galarza, J. Food Protection 48:407–411 (1985).

Studies on the use of propionic acid have shown it to be an effective mold inhibitor. Propionic acid also increased storage life of high-moisture grain (Jones, G. M., et al, Can. J. Anim. Sci. 54:499 (1974)), decreased soluble protein loss, and improved aerobic stability (Woolford, M. K., et al., Proc. 13th International Grassland Congr. Leipzig (1977); Britt, D. G., et al, J. Dairy Sci. 58:532 (1975); Hara, S., et al., Jap. J. Zootech. Sci. 50:288 (1979); Raeker et al in Cereal Chemistry 69(1):66–69 (1992) and by Woskow et al, Applied and Environmental Microbiology 57:2821–2828 (1991)).

U.S. Pat. No. 5,534,271 to Ware et al and U.S. Pat. No. 5,529,793 to Garner et al describe direct feeding without ensiling. It is believed that ensiling produces better results.

There is still a need for an improved propionibacterium for ensiling silage and in particular high moisture corn.

OBJECTS

It is therefore an object of the present invention to provide an improved method for ensiling silage including high moisture corn using a unique strain of Propionibacterium isolated from corn and thus is natural to cattle. Further, it is an object of the present invention to provide a strain of Propionibacterium which provides good inhibition of yeasts and molds after the ensiling is completed and the silage is subjected to aerobic conditions. These and other objects will become increasingly apparent by reference to the following description and the drawings.

DESCRIPTION OF PREFERRED EMBODIMENTS

Figure 1:
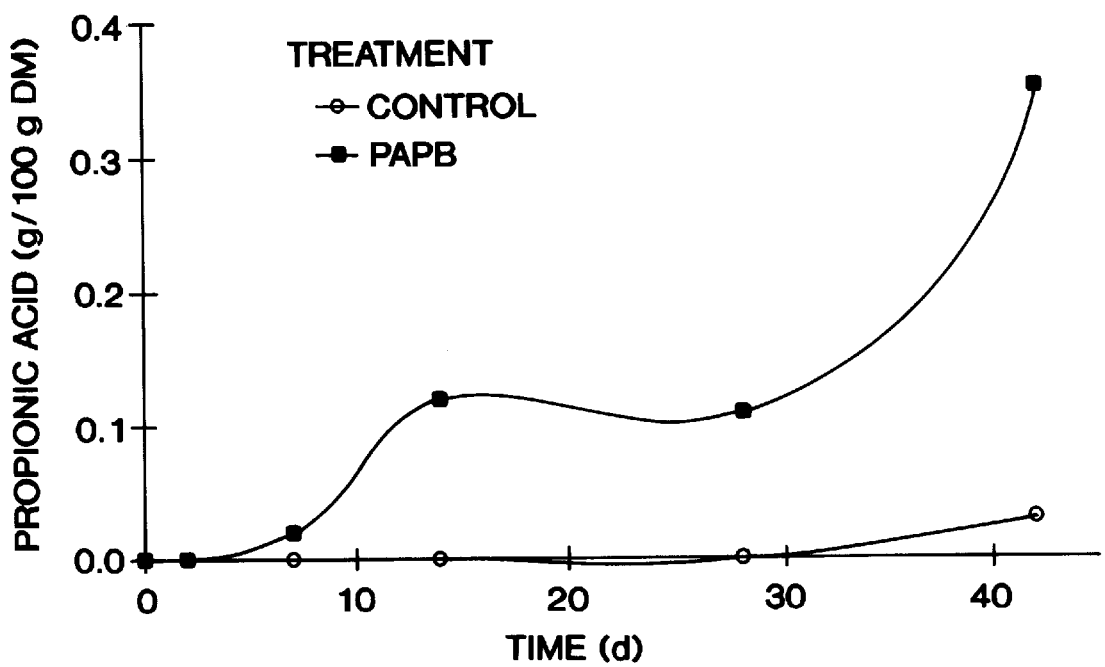
FIG. 1 is a graph showing the effect of *Propionibacterium acidipropionici* DH42 (PAPB) on the propionic acid content during the ensilement of high-moisture corn.

The present invention relates to a method of ensiling silage which comprises inoculating the silage with an ensiling number of viable cells of *Propionibacterium acidipropionici* DH42 deposited as ATCC 55737 so that the silage is ensiled.

The present invention further relates to a composition which comprises viable cells of *Propionibacterium acidipropionici* DH42 deposited as ATCC 55737; and a carrier for the DH42 which enables the DH42 to be inoculated into silage.

The present invention relates to a method of ensiling high-moisture corn (HMC) containing between about 24 to 30% by weight moisture which comprises: inoculating the HMC with an ensiling number of viable cells of *Propionibacterium acidipropionici* DH42 deposited as ATCC 55737, wherein the ensiled HMC contains at least about 0.3 g of propionic acid per 100 g of dry matter under aerobic conditions in a silo.

Further, the present invention relates to a composition which comprises: viable cells of *Propionibacterium acidipropionici* DH42 deposited as ATCC 55737; and a carrier for the DH42 which enables the DH42 to be inoculated into high moisture corn (HMC) containing between abut 24–30% by weight moisture.

The term "silage" as used herein means any vegetable material which is used as a feed for animals and which is to be stored in a silo. Included is corn and also various feed grasses as is well known to those skilled in the art. The moisture content is 20% to 80% moisture.

*Propionibacterium acidipropionici* DH42 was deposited with the American Type Culture Collection (ATCC), 1801 University Blvd., Manassas, Va. 20110-2209 under the Budapest Treaty on Jan. 31, 1996 as Deposit No. ATCC 55737. It was isolated from corn, whereas the prior art cultures are used in cheese making.

Lactic acid producing bacteria can be used in the method and compositions, such bacteria include: *Lactobacillus acidophilus; Lactobacillus plantarum; Streptococcus faecium; Lactobacillus casei; Lactobacillus lactis; Lactobacillus enterii; Lactobacillus fermentum; Lactobacillus delbruckii; Lactobacillus helveticus; Lactobacillus curvatus; Lactobacillus brevis; Lactobacillus bulgaricus; Lactobacillus cellobiosuus; Streptococcus lactis; Streptococcus thermophilus; Streptococcus cremoris; Streptococcus diacetylactis; Streptococcus intermedius; Bifidobacterium animalis; Bifidobacterium adolescentis; Bifidobacterium bifidum; Bifidobacterium infantis; Bifidobacterium longum; Bifidobacterium thermephilum; Pediococcus acidilactici; and Pediococcus pentosaceus.*

The bacteria are used in cell counts or numbers (cell forming units or CFU) of between about $10^6$ to $10^{12}$/gm. Most preferred is between about $10^5$ and $10^6$/gm.

The bacteria can be added to the silage in a liquid medium, preferably with nutrients. The bacteria can also be adsorbed into solids, such as calcium carbonate, celluloses, clays and the like for introduction into the silage.

EXAMPLE 1

In this Example, the effects of a particular isolated propionic acid-producing bacterial bioinoculant on fermentation characteristics and aerobic stability of ensiled, high-moisture corn were evaluated. Addition of *Propionibacterium acidipropionici* DH42 (previously isolated from ensiled high-moisture corn), increased propionic acid content (0.35 vs. 0.03 g/100 g dry matter (DM)) after 42 days of ensilement. In addition, corn treated with *P. acidipropionici* DH42 had greater acetic acid concentration, lower pH, lower numbers of yeasts and molds and higher dry matter recovery after 42 days of ensilement. Temperature increased in control corn after three days of aerobic exposure, whereas the temperature of *P. acidipropionici* DH42 treated corn remained unchanged from ambient temperature. After five days of aerobic exposure, increases in pH, numbers of yeasts and mold, numbers of Acetobacter spp., and numbers of total aerobic bacteria were observed in control, indicating poorer aerobic stability. Propionic acid concentration was higher (0.61 vs 0 g/100 g DM) after five days of aerobic exposure in high-moisture corn ensiled with *P. acidipropionici* DH42. In addition, organic matter recovery of inoculated corn was greater after five days aerobic exposure. Inoculation of high-moisture corn with *P. acidipropionici* DH42 improved the ensiling fermentation and reduced aerobic instability of ensiled, high-moisture corn. The same results can be achieved in other silage.

MATERIALS AND METHODS

High-moisture corn (74% DM) was obtained from a commercial elevator (Mason, Mich.) and ensiled in laboratory silos (45.7×10.2 cm dia.) constructed of poly-vinyl-chloride pipe and fitted with rubber caps as described by Wardynski (Wardynski, F. A., Effects of Microbial Cultures and Various Other Additives on the Feeding Quality, Fermentation pattern, Dry Matter Recovery and Aerobic Stability of High Moisture Corn, M.S. Thesis. Michigan State University, East Lansing, Mich. (1991)). The corn appeared fresh and did not have any characteristics associated with pre-fermented corn. A rubber policeman (Fisher Scientific, Chicago, Ill.) was slit and inserted with copper tubing into the cap to allow gas release during ensiling. Thirty silos were used in a 2×6 factorial arrangement of treatments consisting of two treatments (control and *P. acidipropionici* DH42) and six periods of ensilement (0, 2, 7, 14, 28 and 42 d) with three silos for each treatment and period of ensilement combination.

*Propionibacterium acidipropionici* DH42, a propionic acid-producing bacteria previously isolated from ensiled high-moisture corn, was grown aerobically in a shaker water bath (60 rpm, 30° C.) to late log phase in Actinomyces broth (BBL, Cockeysville, Md.). A 1.5 ml aliquot was applied to 2 kg corn using a 3 ml syringe with a 22 gauge needle while hand mixing, to assure homogenous application. The culture was applied to a final concentration of $10^6$ cfu·g$^{-1}$·DM$^{-1}$. Inoculation rate was based on the recommended amounts of lactic acid-producing bacteria to be added as silage inoculants (Muck, R. E., J. Dairy Sci. 71:2992 (1988)). Culture density of the inoculum was $10^9$ cfu/ml as determined by serial dilutions in purple base broth (BBL 11558, Cockeysville, Md.) with 1% erythritol (Sigma, St. Louis, Mo.). Bacteria in the genus Propionibacterium are unique in their ability to ferment erythritol to propionic and acetic acids (Holdeman, L., et al., Anaerobe Laboratory Manual. 4th Ed. Virginia Polytechnic Institute, Blacksburg (1977)). Therefore, use of erythritol as a fermentation substrate and bromocresol purple (pH range 5.2 to 6.8) as an acidic pH indicator dye allows for estimating numbers of propionic acid-producing bacteria when used in a most probable numbers procedure.

Aqueous extracts of the ensiled, high-moisture corn were obtained by homogenizing 50 g of sample in 450 ml sterile 0.9% NaCl (pH 7.0) using a STOMACHER (Tekmar 3500, Cincinnati, Ohio) for 5 min. The pH of the aqueous extract was measured within five minutes of extraction at 23° C. using a combination glass electrode (AccupHast, Fisher Scientific, Chicago, Ill.) attached to a digital pH meter (Fisher Scientific 825MP pH meter, Fisher Scientific, Chicago, Ill.) standardized from pH 4 to 7 using commercial buffers (Curtis Mattheason, Woodale, Ill.). Serial dilutions of the aqueous corn extract after addition of the inoculum into bromocresol purple-erythritol medium supplemented with amphotericin-B (Sigma, St. Louis, Mo.), a mycostatic agent used in mammalian cell culture, allowed an estimation of the added *P. acidipropionici* DH42. Serial dilutions were incubated aerobically for 48 h at 30° C. and the highest dilution that showed growth and a yellow coloration (indication of erythritol fermentation) was used as an estimate of the number of propionic acid-producing bacteria. An appropriate control consisted of 1.5 ml of sterile 0.9% NaCl. Lactic acid-producing bacteria were enumerated on pour plates of LBS agar medium (Difco, Detroit, Mich.). Yeasts and molds were enumerated on pour plates of Rose Bengal agar medium base supplemented with chloramphenicol (Difco, Detroit, Mich.). The media described by Spoelstra and coworkers (Spoelstra, S. F., et al., J. Agric. Sci. 111:127 (1988)) was used as pour plates to enumerate Acetobacter spp. Total aerobic bacteria were enumerated on pour plates of tryptic soy agar (Difco, Detroit, Mich.).

Dry matter and ash were determined according to AOAC (Association of Official Analytical Chemists International. Official Methods of Analysis (14th Ed.) Association of Official Analytical Chemists. Washington, D. C. (1984)) by drying at 60° C. for dry matter and ignition at 550° C. for ash. Glucose, lactic acid, acetic acid, propionic acid and ethanol were determined by ion exchange-exclusion HPLC (BIORAD aminex HPX-87H, Richmond, Calif.) following the general procedures of Canale et al. (Canale, A., et al., J. Sci. Food Agric. 35:178 (1984)). Mobile phase consisted of 0.005 N $H_2SO_4$ at a flow rate of 0.9 ml/min. Column temperature was maintained at 65° C. by an external column heater (Waters Millipore, Milford, Mass.). Three ml of aqueous extracts from each sample of ensiled, high-moisture corn were filtered through 0.2 $\mu$m ion chromatography syringe filters (Gelman Acrodisks, 25 mm, Ann Arbor, Mich.) into 3 ml HPLC sample vials (National Scientific, Atlanta, Ga.). Filtered samples were stored at −20° C. until analysis. Twenty $\mu$ml of the filtered samples was injected by an autoinjector (Waters WISP 712, Milford, MA) and analytes were detected by refractive index (Waters 410 refractive index detector, Milford, MA). Peak heights were quantified by a commercial HPLC software package (Turbochrom 3, PE Nelson, Cupertino, Calif.) and compared to external standards of glucose, ethanol, lactate, acetate and propionate (Supelco, Bellefonte, Pa.).

Statistical analyses. The fermentation experiment was analyzed as a completely randomized design by analysis of variance (Steele, R. G., et al., A Biometrical Approach. McGraw-Hill, New York (1980)) using the general linear models (GLM) procedure of the Statistical Analysis System (SAS., SAS/STAT® Guide for Personal Computers (6th Ed.) SAS Inst., Inc., Cary, N.C. (1987)). Individual treatment means were compared using the Bonferroni t-test (SAS., SAS/STAT® Guide for Personal Computers (6th Ed.) SAS Inst., Inc., Cary, N.C. (1987)). The ANOVA model for the fermentation study was as follows:

$$Y_{ijk} = \mu + T_j + D_j + (T \cdot D)_{ij} + e_{ijk}$$

where:

$Y_{ijk}$=Individual response variable measured (e.g., pH, numbers of lactic acid-producing bacteria, propionic acid).

$\mu$=overall mean.

$T_j$=Effect of treatment (Control or *P. acidipropionici* DH42)

$D_j$=Effect of period of ensilement (0, 2, 7, 14, 28 or 42 days).

$(T \cdot D)_{ij}$=Interaction of treatment and period of ensilement.

$e_{ijk}$=Random residual effect (assumed normally distributed).

Aerobic stability was analyzed as above but using the repeated measure option of the general linear models procedure (SAS. SAS/STAT® Guide for Personal Computers (6th Ed.) SAS Inst., Inc., Cary, N.C. (1987)) since repeated measurements were made on each silo opened after 42 days.

RESULTS AND DISCUSSION

Fermentation characteristics

Both the control and treated (*P. acidipropionici* DH42) corn followed a normal fermentation pattern observed in ensiled, high-moisture corn (Rust, S. R., et al., J. Prod. Agric. 5:454 (1992)) except increased propionic acid in corn inoculated with *P. acidipropionici* DH42. The pH values (Table 1) showed the characteristic decrease (P<0.01) seen during typical ensilement of high-moisture corn (Wardynski, F. A., Effects of Microbial Cultures and Various Other Additives on the Feeding Quality, Fermentation Pattern, Dry Matter Recovery and Aerobic Stability of High Moisture Corn, M.S. Thesis. Michigan State Univ., East Lansing, Mich. (1991); and Wardynski, F. A., et al., J. Anim. Sci. 71:2246 (1993)).

TABLE 1

Effect of *Propionibacterium acidipropionici* DH42 on chemical characteristics during the ensilement of high-moisture corn

| Time | pH | | Acetic Acid, g/100 g DM | | Lactic acid, g/100 g DM | | Glucose, g/100 g DM | | Ethanol, g/100 g DM | |
|---|---|---|---|---|---|---|---|---|---|---|
| (d) | Control | PAPB[1] | Control | PAPB | Control | PAPB | Control | PAPB | Control | PAPB |
| 0 | 5.39 | 5.45 | 0.00 | 0.00 | 0.00 | 0.00 | 0.34 | 0.29 | 0.00 | 0.00 |
| 2 | 5.24 | 5.28 | 0.18 | 0.26 | 0.46 | 0.52 | 0.01 | 0.02 | 0.85 | 0.84 |
| 7 | 4.84 | 4.78 | 0.18 | 0.32 | 0.68 | 0.74 | 0.01 | 0.00 | 1.44 | 1.63 |
| 14 | 4.57[a] | 4.46[b] | 0.29 | 0.34 | 1.26 | 0.89 | 0.01 | 1.01 | 2.21 | 1.60 |
| 28 | 4.35[a] | 4.20[b] | 0.14 | 0.15 | 0.64 | 0.43 | 0.02 | 0.03 | 0.96 | 0.72 |

TABLE 1-continued

Effect of *Propionibacterium acidipropionici* DH42 on chemical characteristics during the ensilement of high-moisture corn

| Time | pH | | Acetic Acid, g/100 g DM | | Lactic acid, g/100 g DM | | Glucose, g/100 g DM | | Ethanol, g/100 g DM | |
|---|---|---|---|---|---|---|---|---|---|---|
| (d) | Control | PAPB[1] | Control | PAPB | Control | PAPB | Control | PAPB | Control | PAPB |
| 42 | 4.32[a] | 4.17[b] | 0.29[a] | 0.63[b] | 0.72 | 0.75 | 0.00 | 0.04 | 1.67 | 1.13 |
| SEM | 0.033 | | 0.079 | | 0.146 | | 0.027 | | 0.289 | |

[1]PAPB = Addition of *Propionibacterium acidipropionici* DH42 at ensilement.
[a,b]Means in the same row within chemical characteristic that do not have common superscripts differ (P < .05).

However, addition of *P. acidipropionici* DH42 resulted in high-moisture corn with lower pH (P<0.05) after 14 days of ensilement. The pH values obtained in this Example followed the same pattern observed in a similar study (Dawson, T. E., et al., Abst. 62 in 21st Biennial conference on Rumen Function, Chicago, Ill. (1991)) using *P. acidipropionici* ATCC 4965 and *P. freudenreichii* ATCC 6207 in reconstituted high-moisture corn.

The hypothesis to be tested was that the addition of *P. acidipropionici* DH42 would increase production of propionic acid during ensilement. A treatment by time interaction (P<0.01) was observed for propionic acid concentration (FIG. 1). Propionic acid was not detected in aqueous extracts of control or treated high-moisture corn during the first 2 days of ensilement. Propionic acid concentration increased in *P. acidipropionici* DH42 treated corn to values greater (P<0.01) than control corn after 14 days. Control corn had measurable amounts (0.03 g /100 g DM) of propionic acid after 42 days of ensilement which has also been observed in control and corn treated with a lactic acid-producing bacterial inoculant (Wardynski, F. A., et al., J. Anim. Sci. 71:2246 (1993)). In an earlier study (Dawson, T. E., et al., Abst. 62 in 21st Biennial Conference on Rumen Function. Chicago, Ill. (1991)), propionic acid concentration was greatest after 14 days in reconstituted, high-moisture corn treated with *P. acidipropionici* ATCC 4965 and *P. freudenreichii* ATCC 6207. This was not the case in this study, as the addition of *P. acidipropionici* DH42 reached a maximum concentration of propionic acid after 42 days. A longer period of ensilement provides an increase in the production of propionic acid with DH42.

Acetic acid (Table 1) concentration increased (P<0.01) during ensilement and was higher (P<0.01) in corn treated with *P. acidipropionici* DH42 after 42 days of ensilement. The higher amount of acetic acid is to be expected in the treated corn because acetic acid is a co-metabolite of the fermentation of carbohydrates and lactic acid by *P. acidipropionici* DH42. Another fermentation acid highly correlated to a decrease in silage pH is lactic acid. The concentration of lactic acid (Table 1) increased (P<0.01) through 14 days in both the control and treated corn indicating similar lactic acid fermentation patterns throughout the ensilement period. Glucose (Table 1) was rapidly fermented and was essentially undetectable by d 2 (P<0.01). Ethanol (Table 1) increased through the first 14 d (P<0.01) of ensiling in both control and treated corn. No differences (P<0.1) were observed between treatments, possibly due to the large variation in ethanol concentration.

Numbers of lactic acid-producing bacteria (Table 2) increased (period of ensiling P<0.01) at an exponential rate during the first 7 days of ensilement.

TABLE 2

Effect of *Propionibacterium acidipropionici* DH42 on microbial characteristics during the ensilement of high-moisture corn

| | Lactic-acid-producing bacteria, log cfu per g DM | | Yeasts and molds, log cfu per g DM | | Coliforms, log cfu per g DM | |
|---|---|---|---|---|---|---|
| Time | | | | | | |
| (d) | Control | PAPB[1] | Control | PAPB | Control | PAPB |
| 0 | 3.39 | 3.49 | 3.57 | 3.90 | 6.90[a] | 6.63[b] |
| 2 | 6.39 | 6.35 | 5.28 | 5.42 | 7.06 | 7.02 |
| 7 | 8.41 | 8.34 | 4.43 | 4.68 | 6.45 | 6.45 |
| 14 | 8.57 | 8.47 | 6.22 | 6.25 | 6.38[a] | 5.98[b] |
| 28 | 8.45 | 8.47 | 5.34 | 4.08 | 6.27[a] | 6.12[b] |
| 42 | 8.46[a] | 8.19[b] | 4.93[a] | 4.16[b] | 8.05[a] | 7.51[b] |
| SEM | 0.068 | | 0.199 | | 0.051 | |

[1]PAPB = Addition of *Propionibacterium acidipropionici* DH42 at ensilement.
[a,b]Means in the same row within microbial characteristic that do not have common superscripts differ (P < .05).

The increase in numbers of lactic acid-producing bacteria corresponded to the decrease in pH and increase in lactic acid concentration. Addition of *P. acidipropionici* DH42 prior to ensilement resulted in lower (P<0.01) numbers of lactic acid-producing bacteria after 42 days. Since direct measurements of the type of populations of lactic acid-producing bacteria were not made, conclusions of the effect of *P. acidipropionici* DH42 on homofermentative lactic acid-producing bacteria cannot be made.

Yeast and mold numbers (Table 2) increased throughout the first 14 days of ensilement (P. 0.01) to maximum values of $10^{6.2}$ cfu·$g^{-1}$·$DM^{-1}$ for both control and treated corn. Numbers of yeasts and molds are important because they have a major role in the aerobic deterioration of ensiled, high-moisture corn (Muck, R. E., J. Dairy Sci. 71:2992 (1988); Ruxton, G. D., et al., J. Sci. Food Agric. 62:209 (1993); and Woolford, M. K., J. Appl. Bacteriol. 68:101 (1990)). The increase in numbers of yeasts and molds could explain the observed increase in ethanol, a major end-product of their metabolism. However, yeast and mold numbers decreased after 14 days and tended (P<0.1) to be lower after 28 days in the corn treated with *P. acidipropionici* DH42. Addition of *P. acidipropionici* DH42 was effective in decreasing number of yeasts and molds after 42 days of ensilement.

Presence of high numbers of coliform bacteria is generally an indication of poor quality silage (Woolford M. K., J. Appl. Bacteriol. 68:101 (1990)). Numbers of coliforms (Table 2) were higher (P<0.05) on d 0 for control corn. However, after 2 d of ensilement both the *P. acidipropionici* DH42 treated and control corn had similar numbers of coliforms indicating the d 0 values did not cause a discernible effect on their numbers after 2 d ensiling. Addition of *P. acidipropionici* DH42 decreased proliferation of coliforms as shown by lower (P<0.05) numbers after 14, 28 and 42 days of ensilement.

Dry matter and organic matter recovery were measured after 42 days of ensilement. Dry matter recovery (Table 3) was improved (P<0.05) from 96.8% for control corn to 98.7% by addition of *P. acidipropionici* DH42. Organic matter recovery (Table 3) was numerically higher (P<0.25) in the *P. acidipropionici* DH42 treated corn (99.6 vs. 99.3%).

Aerobic Stability

Figure 2:
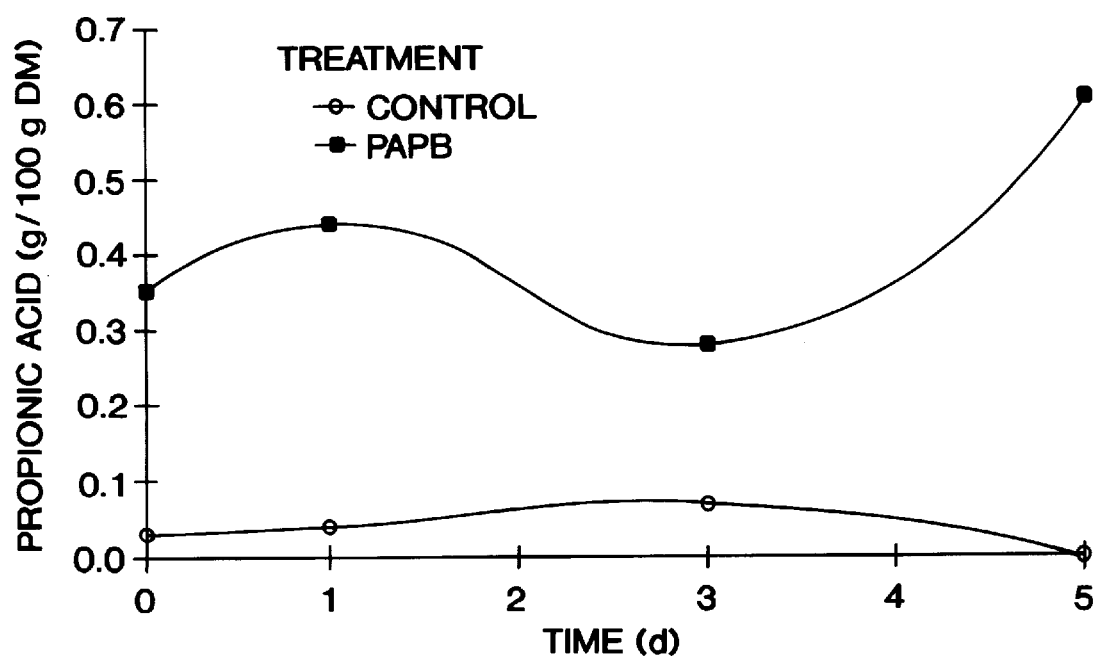
FIG. 2 is a graph showing the effect of *Propionibacterium acidipropionici* DH42 (PAPB) on the propionic acid content during the aerobic exposure of ensiled, high-moisture corn.

Since propionic acid is commonly used as a chemical aid to prevent aerobic deterioration (Pitt, R. E., NRAES-5 (1990)), it was theorized that the addition of *P. acidipropionici* DH42 prior to ensilement would increase propionic acid concentration of ensiled, high-moisture corn. This was the case after 42 d fermentation (FIG. 1) and also during the 5 d aerobic exposure period (FIG. 2). Propionic acid disappeared from the control corn after 5 d aerobic exposure. To the contrary, corn treated with *P. acidipropionici* DH42 showed an increased propionic acid concentration with the highest amount after 5 d (0.61 g/100 g DM). The amount of propionic acid that is recommended for the addition to corn (70% DM) is 1.1% for 6 months storage (Pitt, R. E., NRAES-5 (1990)). With production of propionic acid during the ensiling process, the amount of propionic acid needed to inhibit aerobic deterioration can be reduced.

During the aerobic exposure period, acetic acid concentration was variable with no consistent pattern (Table 4).

TABLE 3

Effect of *Propionibacterium acidipropionici* DH42 on dry matter and organic matter recoveries of ensiled, high-moisture corn after ensilement and aerobic exposure.

| Time (d) | Dry matter recover, % | | Organic matter recovery, % | |
|---|---|---|---|---|
| | Control | PAPB[1] | Control | PAPB |
| Ensiling | | | | |
| 42 | 96.8[a] | 98.6[a] | 99.3 | 99.6 |
| SEM | 0.45 | | 0.17 | |
| Aerobic Exposure | | | | |
| 1 | 100.5[a] | 99.1[b] | 98.7 | 99.1 |
| 3 | 100.7 | 99.8 | 98.5 | 98.8 |
| 5 | 99.7 | 99.5 | 93.5[a] | 94.4[b] |
| SEM | 0.40 | | 0.21 | |

[1]PAPB = Addition of *Propionibacterium acidipropionici* DH42 at ensilement.
[a,b]Means in the same row within nutrient recovery characteristic that do not have common superscripts differ (P < .05).

The concentration of acetic acid was lower than that observed in the study of Wardynski et al (Wardynski, F. A., et al., J. Anim. Sci. 71:2246 (1993)) where concentration as high as 3 g/100 g DM were attained in high-moisture corn inoculated with lactic acid-producing bacteria. Ethanol concentration decreased (P<0.01) during aerobic exposure for treated and control corn (Table 4). The ethanol was either volatilized into the air or used as a carbon source by aerobic microorganisms.

A treatment and duration of aerobic exposure interaction (P<0.01) was present for lactic acid concentration (Table 4). Greater (P<0.05) concentration of lactic acid was found in the control corn after 3 d exposure and less (P<0.01) after 5 d in comparison to the *P. acidipropionici* DH42 treated corn. Loss of lactic acid is generally associated with aerobic instability and the differences observed in the *P. acidipropionici* DH42 treated corn at 5 d were anticipated due to the increased aerobic stability. However, the lower concentration of lactic acid at d 3 is puzzling. Glucose concentration (Table 4) was slightly increased (P<0.10) by addition of *P. acidipropionici* DH42 after 3 d of aerobic exposure.

A classical response seen in high-moisture corn undergoing aerobic deterioration is an increase in pH over time of aerobic exposure (Rust, S. R., et al., J. Prod. Agric. 5:454 (1992)). The pH of control corn (Table 4) increased (P<0.01) from 4.32 to 6.62 after 5 d of aerobic exposure. Corn treated with *P. acidpropionici* DH42 had a stable pH (4.17) throughout the first 3 d of aerobic exposure and a slight increase to 4.38 after 5 days of aerobic exposure. Addition of *P. acidipropionici* DH42 prior to ensilement was effective in preventing the increased pH normally observed when ensiled feeds are exposed to oxygen.

Yeasts and molds have been implicated in the aerobic deterioration of ensiled feeds, especially ensiled, high-moisture corn (Rust, S. R., et al., J. Prod. Agric. 5:454 (1992)). Addition of *P. acidpropionici* DH42 as a bioinoculant to ensiled, high-moisture corn was effective in maintaining lower (P<0.01) numbers of yeasts and molds (Table 5) during 5 days of aerobic exposure.

TABLE 4

Effect of *Propionibacterium acidipropionici* DH42 on chemical characteristics during the aerobic exposure of ensiled, high-moisture corn

| Time (d) | pH | | Acetic Acid, g/100 g DM | | Lactic acid, g/100 g DM | | Glucose, g/100 g DM | | Ethanol, g/100 g DM | |
|---|---|---|---|---|---|---|---|---|---|---|
| | Control | PAPB[1] | Control | PAPB | Control | PAPB | Control | PAPB | Control | PAPB |
| 0 | 4.32[a] | 4.17[b] | 0.29 | 0.63 | 0.72 | 0.75 | 0.00 | 0.04 | 1.67 | 1.13 |
| 1 | 4.37[a] | 4.22[b] | 0.49 | 0.65 | 1.31 | 1.20 | 0.05 | 0.08 | 1.44 | 1.42 |
| 3 | 4.63[a] | 4.22[b] | 0.12 | 0.32 | 1.38[a] | 0.58[b] | 0.09 | 0.04 | 0.02 | 0.49 |

TABLE 4-continued

Effect of *Propionibacterium acidipropionici* DH42 on chemical characteristics during the aerobic exposure of ensiled, high-moisture corn

| Time | pH | | Acetic Acid, g/100 g DM | | Lactic acid, g/100 g DM | | Glucose, g/100 g DM | | Ethanol, g/100 g DM | |
|---|---|---|---|---|---|---|---|---|---|---|
| (d) | Control | PAPB[1] | Control | PAPB | Control | PAPB | Control | PAPB | Control | PAPB |
| 5 | 6.62[a] | 4.38[b] | 0.17 | 0.48 | 0.50[a] | 1.65[b] | 0.04 | 0.10 | 0.05 | 0.30 |
| SEM | 0.04 | | 0.153 | | 0.215 | | 0.021 | | 0.325 | |

[1]PAPB = Addition of *Propionibacterium acidipropionici* DH42 at ensilement.
[a,b]Means in the same row within chemical characteristic that do not1have common superscripts differ (P < .05).

Control corn had initial yeast and mold numbers of $10^{4.93}$ cfu·g$^{-1}$·DM$^{-1}$ and this increased (P<0.01) dramatically to $10^{7.83}$ cfu·g$^{-1}$·DM$^{-1}$ after 5 d of aerobic exposure. However, numbers of yeasts and molds were 100 times lower (P<0.01) in corn treated with *P. acidipropionici* DH42 after 3 and 5 days of aerobic exposure. Besides yeasts and molds, Acetobacter spp. have been implicated in the initiation of aerobic deterioration (Spoelstra, S. F., et al., J. Agric. Sci. 111:127 (1988)). Numbers of Acetobacter spp. (Table 5) were also reduced by addition of *P. acidipropionici* DH42 and followed the same trends observed with the proliferation of yeasts and molds in the control corn.

TABLE 5

Effect of *Propionibacterium acidipropionici* DH42 on microbial characteristics during the aerobic exposure of ensiled, high-moisture corn

| Time | Total aerobic bacteria, log cfu per g DM | | Yeasts and molds, log cfu per g DM | | Acetobacter spp. log cfu per g DM | |
|---|---|---|---|---|---|---|
| (d) | Control | PAPB[1] | Control | PAPB | Control | PAPB |
| 0 | 8.33[a] | 8.13[b] | 4.93[a] | 4.17[b] | 5.00[a] | 4.00[b] |
| 1 | 8.00 | 8.00 | 5.23[a] | 4.00[b] | 5.00[a] | 3.93[b] |
| 3 | 8.17[a] | 7.63[b] | 6.93[a] | 4.67[b] | 6.93[a] | 4.37[b] |
| 5 | 8.57[a] | 8.03[b] | 7.83[a] | 5.17[b] | 7.93[a] | 5.20[b] |
| SEM | 0.061 | | 0.223 | | 0.182 | |

[1]PAPB = Addition of *Propionibacterium acidipropionici* DH42 at ensilement.
[a,b]Means in the same row within microbial characteristic that do not have common superscripts differ (P < .05).

Numbers of total aerobic bacteria after 5 days of aerobic exposure (Table 5) were decreased (P<0.01) by addition of *P. acidipropionici* DH42. Whereas, the number of total aerobic bacteria increased in the control corn. Numbers of aerobic bacteria are an indication of the inherent instability of ensiled feedstuffs. Therefore ensiled material is predisposed to be aerobically unstable with higher numbers of aerobic microorganisms.

Figure 3:
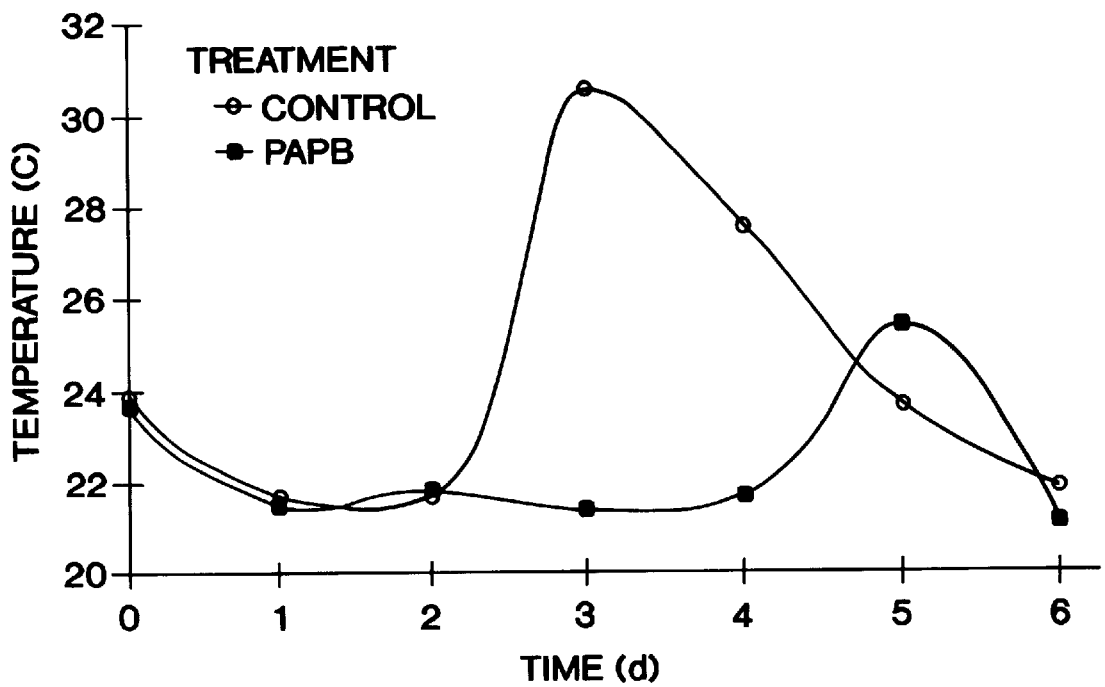
FIG. 3 is a graph showing the effect of *Propionibacterium acidipropionici* DH42 (PAPB) on the temperature during the aerobic exposure of ensiled, high-moisture corn.
Figure 4:
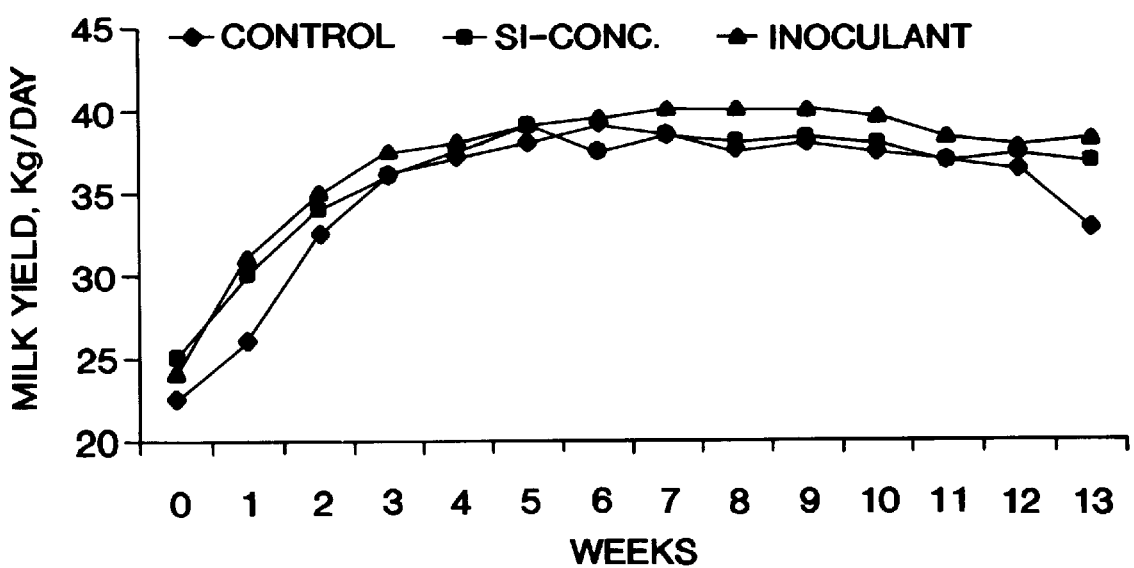
FIG. 4 is a graph showing lactation performance with and without inoculants.
Figure 5:
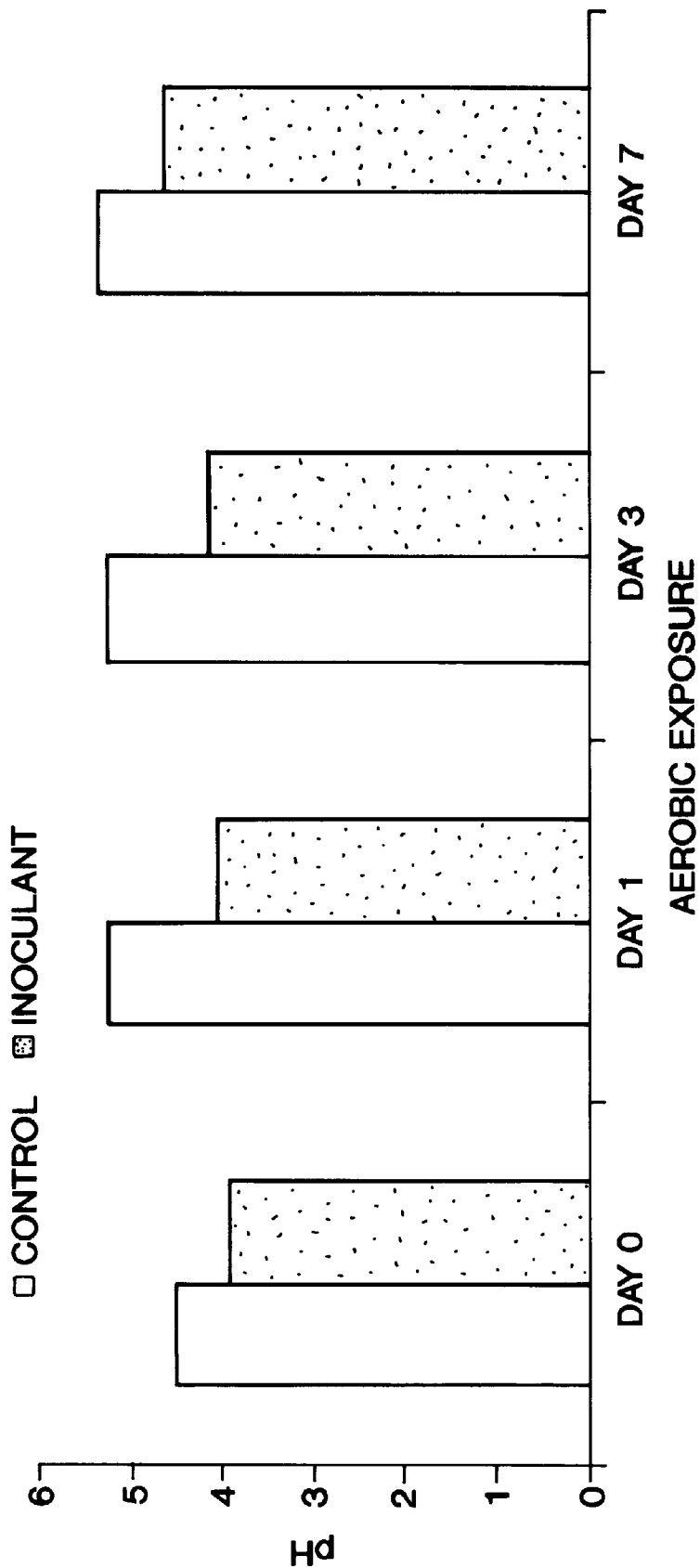
FIG. 5 is a graph showing changes of pH during aerobic exposure of the corn silage.
Figure 6:
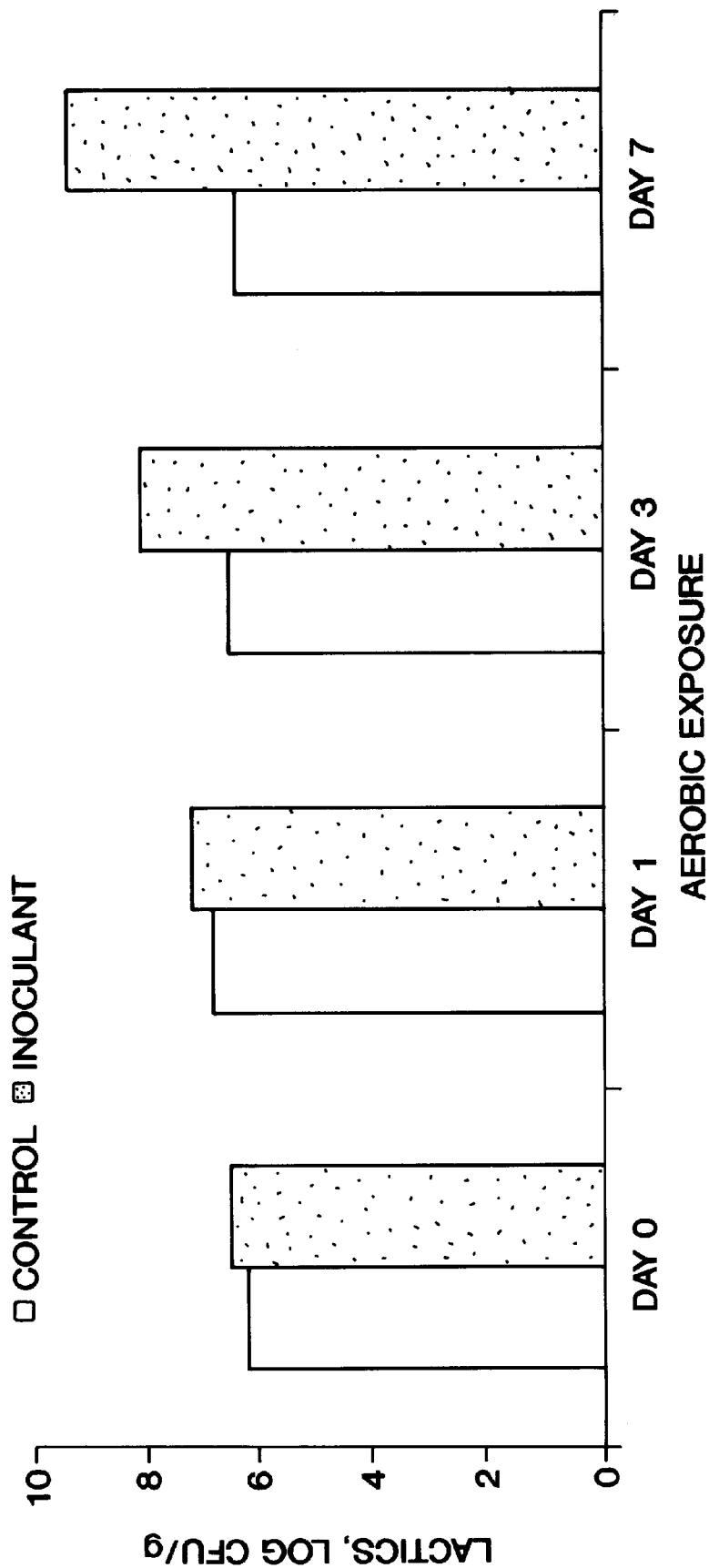
FIG. 6 is a graph showing the count of lactic acid producing bacteria during aerobic exposure of the corn silage.
Figure 7:
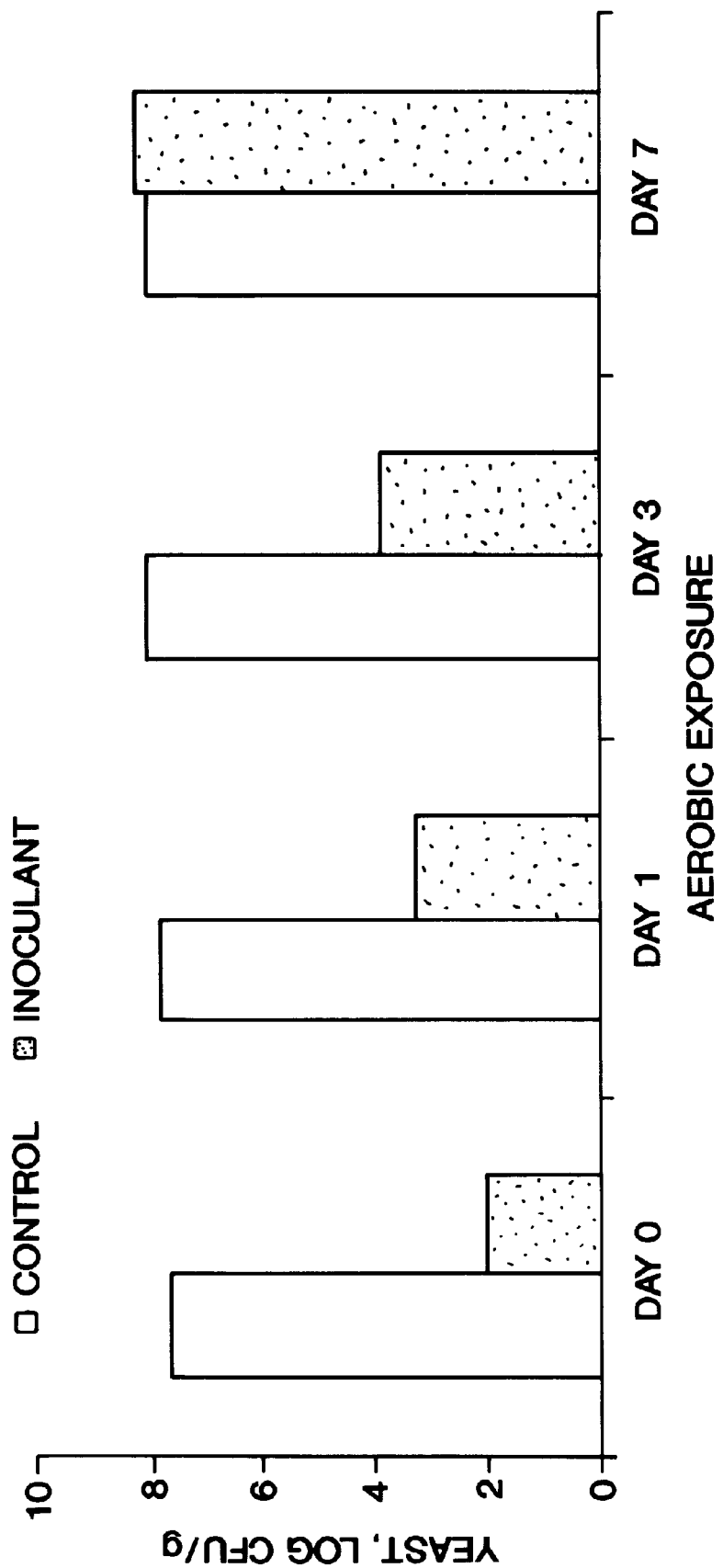
FIG. 7 is a graph showing yeast counts during aerobic exposure of the corn silage.
Figure 8:
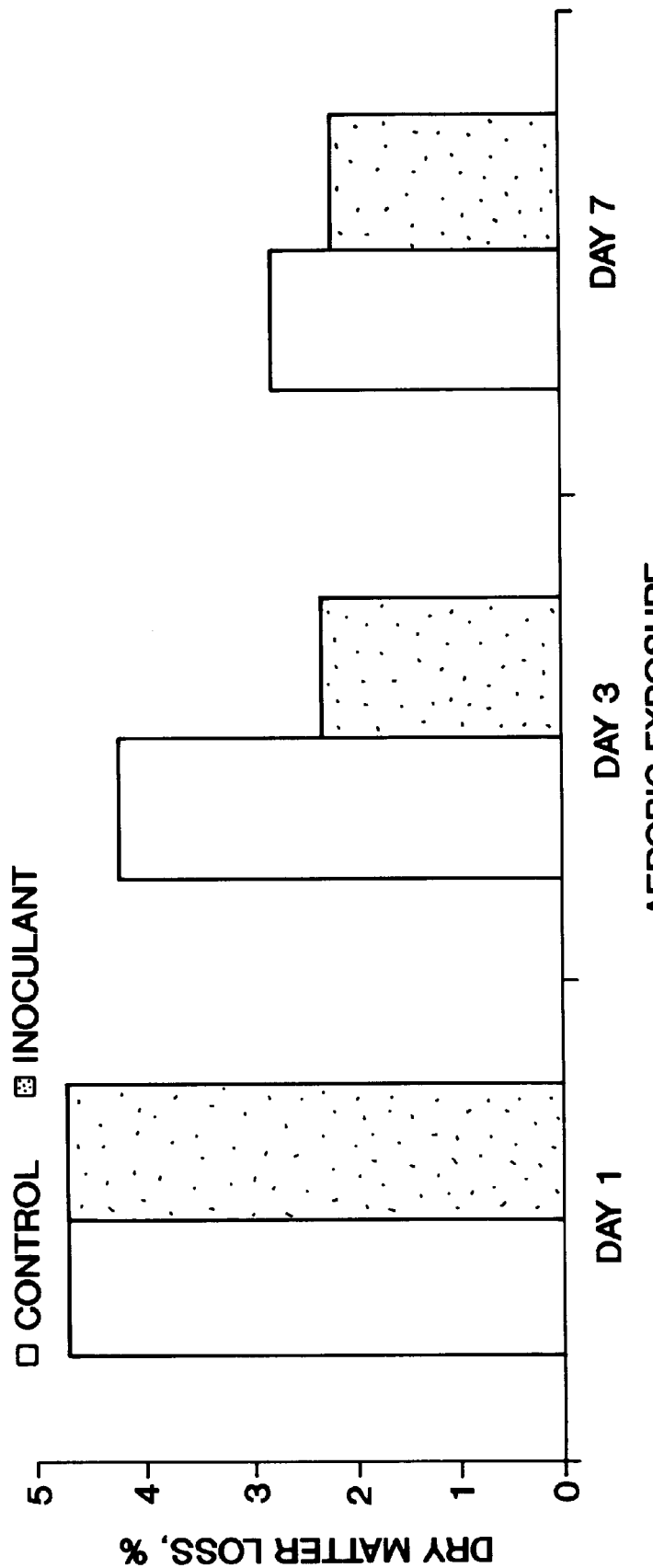
FIG. 8 is a graph showing dry matter loss during aerobic exposure of corn silage.
Figure 9:
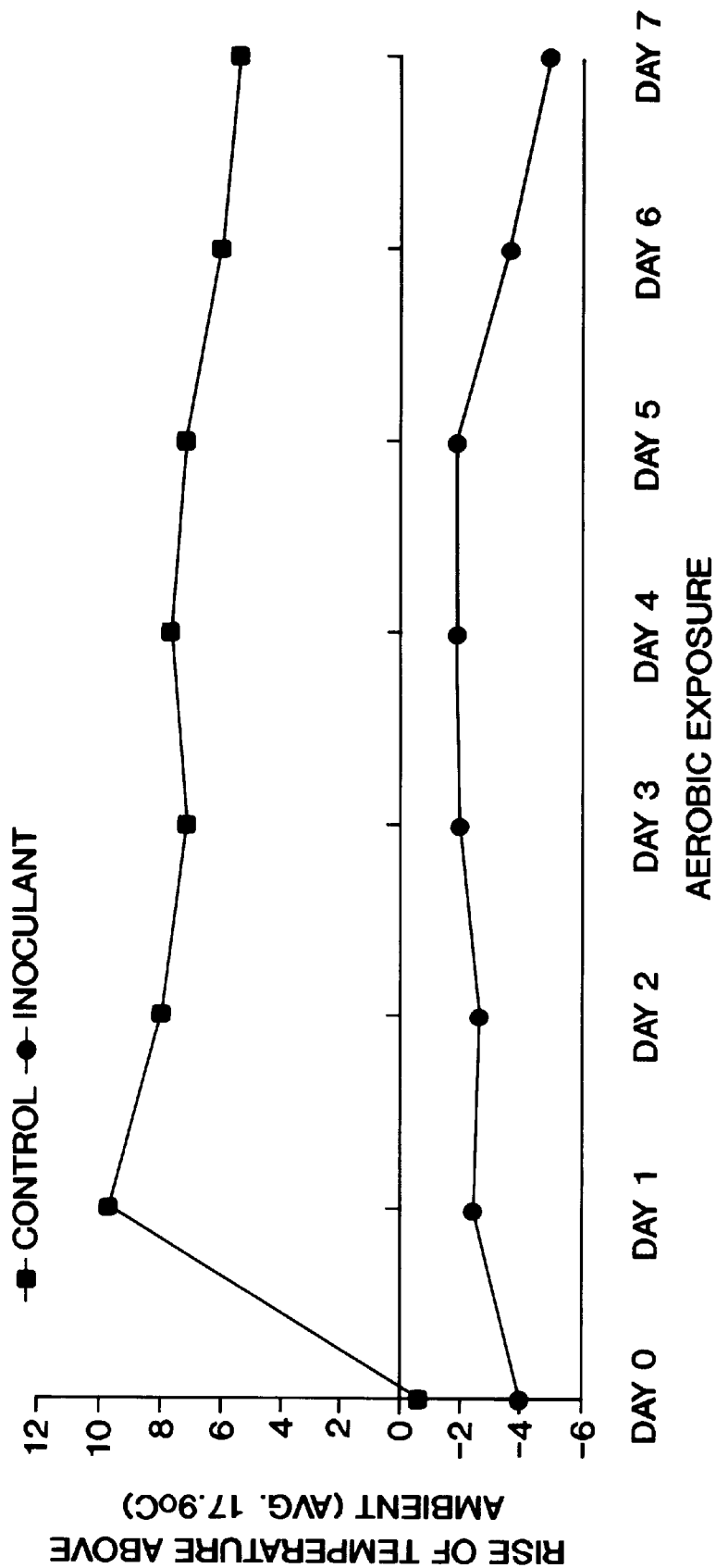
FIG. 9 is a graph showing rise in temperature during aerobic exposure of the corn silage.
Figure 10:
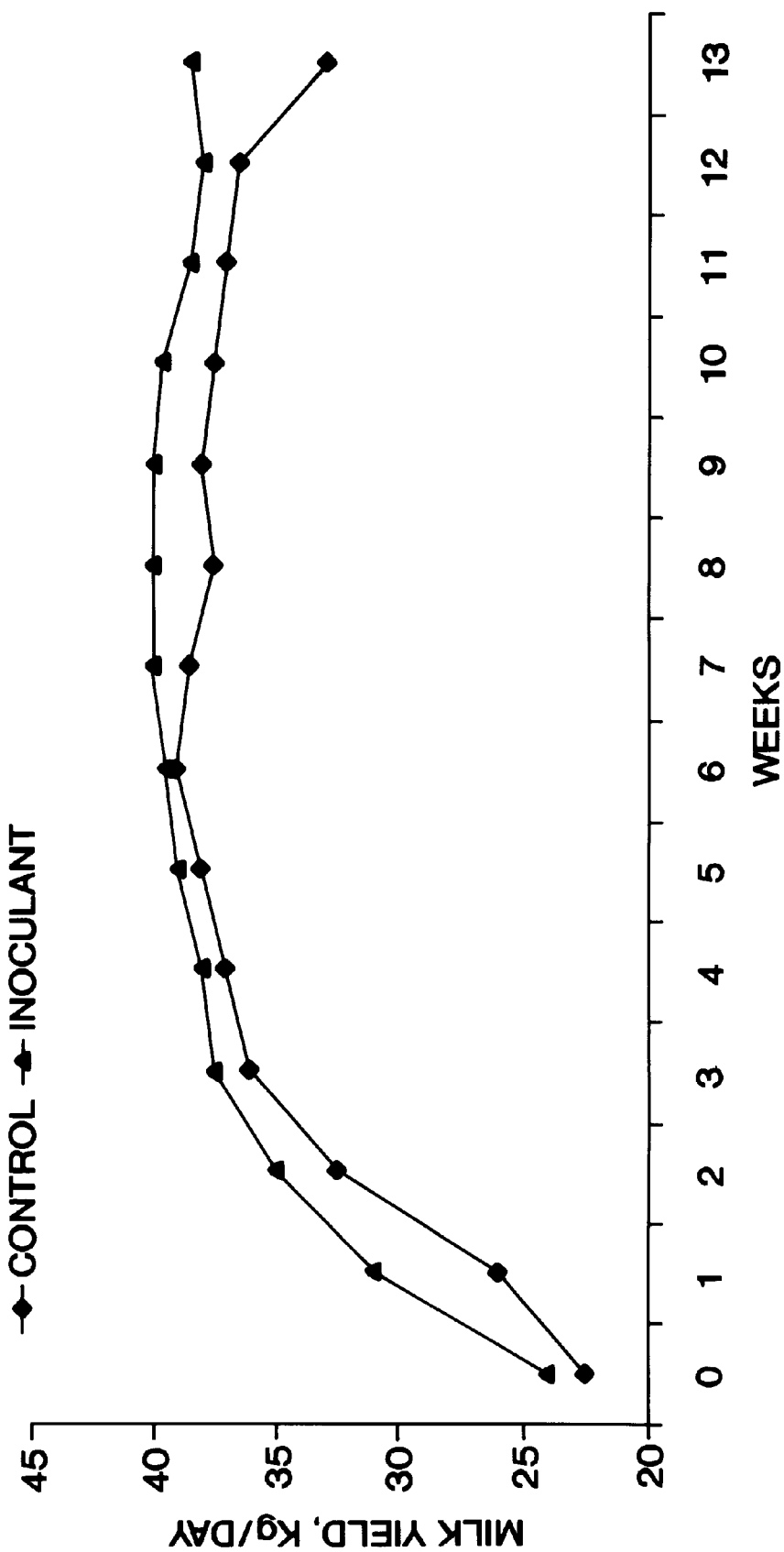
FIG. 10 is a graph showing lactation performance with or without inoculants.
Figure 11:
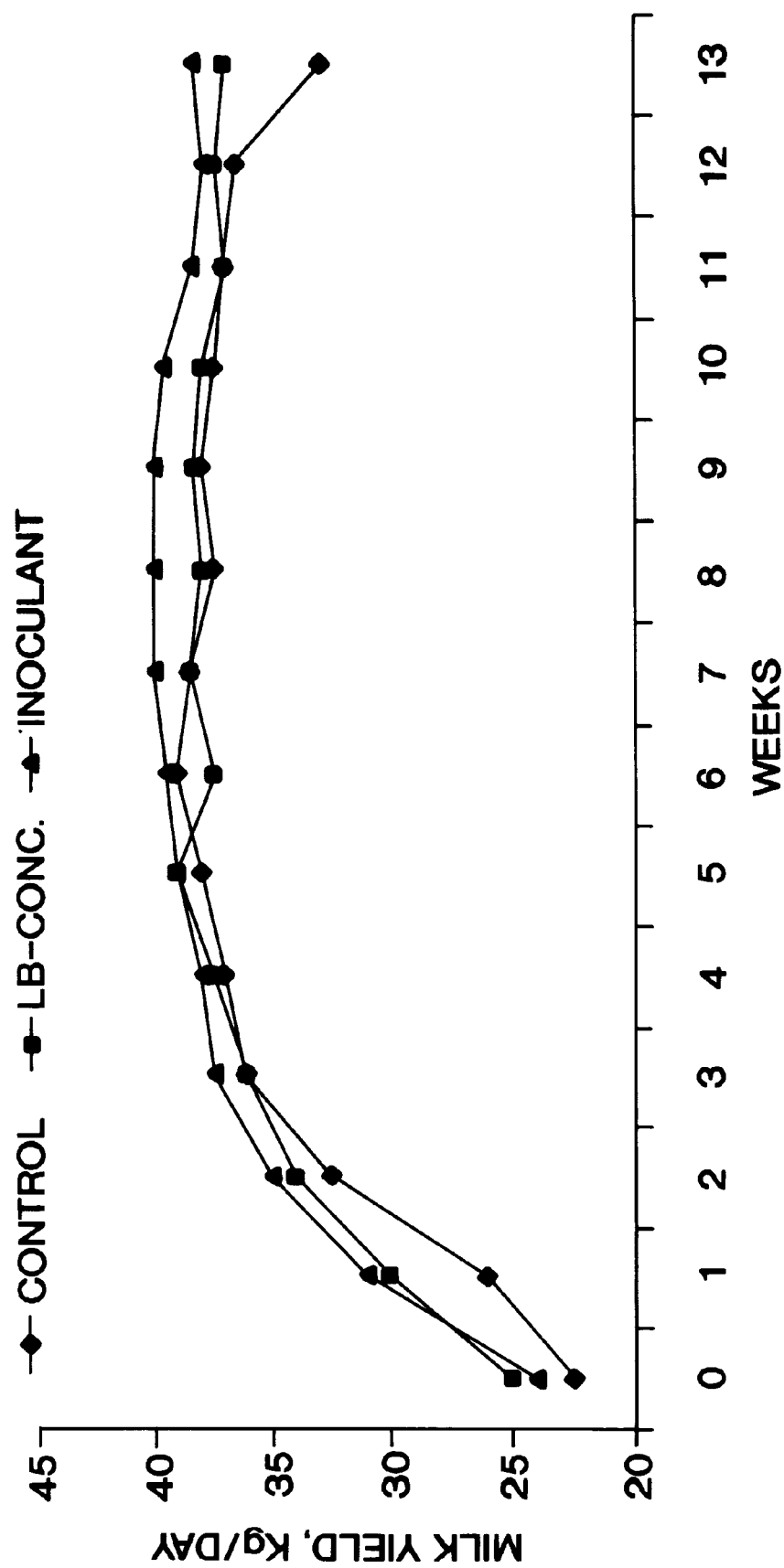
FIG. 11 is a graph showing lactation performance with or without inoculants.

Temperature of aerobically exposed silage increases rapidly in unstable silages due to increased oxidative metabolism and corresponding heat production of aerobic microorganisms. The temperature of high-moisture corn ensiled with a lactic acid-producing bacterial inoculant has been shown to increase to 50° C. within 5 days of aerobic exposure (Wardynski, F. A., et al., J. Anim. Sci. 71:2246 (1993)). The temperature of the control corn in this study (FIG. 3) increased to 30° C. within 3 days of aerobic exposure. Even though this increase in temperature indicated an instability, it was not as severe as the corn treated with a lactic acid-producing bacteria in the study reported by Wardynski et al (Wardynski, F. A., et al., J. Anim. Sci. 71:2246 (1993)). In contrast, the temperature of the corn treated with *P. acidipropionici* DH42 remained unchanged after 5 d of aerobic exposure, indicating a more stable material.

Overall stoichiometry of substrates fermented and end-products formed cannot be directly evaluated. All substrates and end-products must be accounted for to precisely estimate the overall balance of carbon. Dry matter and organic matter recoveries (Table 3) were lower (P<0.05) when ensiled, high-moisture corn was exposed to oxygen. Dry matter and organic matter are metabolized to carbon dioxide, water and heat which decreases the amount recovered. Addition of *P. acidipropionici* DH42 did not change the amount of dry matter loss after 5 days of aerobic exposure (Table 3). However, organic matter recovery was increased by addition of *P. acidipropionici* D42 after 5 days of aerobic exposure suggesting a slower rate of nutrient loss.

The aerobic stability of the control corn would have been considered adequate since the temperature was stable for more than 48 hours. Temperature reached a peak (30.6° C.) at 3 days and then declined near ambient. Additionally, the maximum temperature recorded for the treated corn was 5° C. less (25.4° C. vs 30.6° C.) than control corn. The control corn in the study by Wardynski et al (Wardynski, F. A., et al., J. Anim. Sci. 71:2246 (1993)) did not reach a maximal temperature until 9 days of aerobic exposure. Inoculation of high-moisture corn with *P. acidipropionici* DH42 prior to ensilement delayed increases in temperature, pH, numbers of yeasts, molds, aerobic bacteria and Acetobacter indicating a dramatic improvement in aerobic stability over control corn that would have been considered normal ensiled, high-moisture corn.

This addition of *Propionibacterium acidipropionici* DH42 as a bioinoculant to high-moisture corn was successful in modifying the ensiling fermentation and improving aerobic stability. Propionic acid concentration was increased to 0.35g/10 g DM during 42 days of ensilement and to 0.61g/100 g DM after five days of aerobic exposure after ensilement. Aerobic stability was increased dramatically in high-moisture corn inoculated with *P. acidipropionici* DH42 prior to ensilement as evidenced by a more stable temperature and pH and, reduced numbers of yeasts, molds and Acetobacter spp. The results with *Propionibacterium acidipropionici* DH42 versus the control are graphically shown in FIGS. 1 to 3.

EXAMPLE 2

The main object of this Example was to compare DH42 with a commercial propionic acid-producing bacteria (P42), with or without lactic acid-producing bacteria (LAB) as inoculants for high-moisture corn ensiled for 4, 8, 90 and 120 days and to determine the aerobic stability of the resulting silage.

MATERIALS AND METHODS

Silage preparation. The three inoculant cultures and combinations thereof included lactic acid-producing bacteria (LAB) and two propionic acid-producing bacteria (DH42-Michigan State University, East Lansing, Mich.) and Propionibacterium sp. P42 (Laporte Biochem International, Milwaukee, Wis.).

The inoculants were grown aerobically in 0.5 x MRS Lactobacilli broth (Difco, Detroit, Mich.). At least three culture transfers were made to ensure full activation of the strains. The cultures were grown for 18 hours at 39° C. and were added to the high moisture corn at the rate of $10^5$ cfu/g. Nothing was added to the control.

Rolled high moisture corn was ensiled in 96 laboratory silos (47.5×10.2 cm dia). The experimental design was a randomized complete block with a 4×8 factorial arrangement of treatments. Silos were emptied after four ensilement periods (4, 8, 90 and 120 days) to monitor changes in microbial populations and fermentation endproducts. The treatments were: 1) control (no inoculant); 2) DH42; 3) P42; 4) LAB; 5) LAB+DH42; 6) LAB+P42; 7) DH42+P42; and 8) LAB+DH42+P42. The laboratory silos were made of PVC pipe with rubber caps fitted with rubber policeman (Bolsen, K. K., et al., J. Dairy Sci. 58:386 (1992)) for gas release during ensilement. Three silos were prepared for each treatment and ensiling period combination. Fresh, fermented and exposed corn samples were taken for chemical and microbial analyses.

Aerobic stability. The ensiled, high-moisture corn from the 120-day collection was used for aerobic stability evaluation. From each silo, 400 g of HMC were measured into an open plastic bag, placed in a styrofoam container and aerobically exposed for 5 days. Samples were taken on day 1, 3 and 5 for chemical and microbial analyses. A cooking thermometer was placed in each bag to monitor temperature changes. Temperature was recorded daily. The stability test was conducted in a temperature-controlled room (21–23° C.).

Chemical analyses. The dry matter (DM) content was determined as the difference in weight after drying the sample for 48 hours in a force air oven (55° C.).

Aqueous extracts were obtained by homogenizing 50 g corn in 450 ml sterile, 0.9% NaCl in a STOMACHER (Model 3500, Tekmar, Cincinnati, Ohio) for 5 minutes and strained through cheesecloth into 50-ml centrifuge tubes. The pH of the extracts was determined.

Glucose, lactic acid, acetic acid, propionic acid, malic acid and ethanol were determined by HPLC as described in Example 1. The extracts for HPLC analyses were centrifuged (26,000×g) for 30 minutes before analyses.

Microbial analyses. Serial dilutions of the extracts were prepared in 1k peptone broth (Difco, Detroit, Mich.) and appropriate dilutions were plated in various selective media: Rogosa SL broth (BEL) for LAB, Rose bengal agar (Difco, Detroit, Mich.) for yeasts and molds, and Violet red bile agar (BBL) for coliform. The number of PAPB was estimated using serial dilutions in purple base broth (Difco, Detroit, Mich.) with 1% erythritol (Sigma, St. Louis, Mo.).

Statistical Analyses. The data were analyzed using the analyses of variance (MSTAT-C, MSU, East Lansing, Mich.). Mean separation was done using Tukey's HSD test.

RESULTS

Fermentation characteristics. The dry matter contents (Table 6) of the field-harvested corn ranged from 77.42–79.51% which is beyond the recommended level for satisfactory microbial fermentation.

Table 6

Dry matter content (%) of HMC at different ensilement periods.

| Treatment* | Ensilement period (d) | | | | |
|---|---|---|---|---|---|
| | 0 | 4 | 8 | 90 | 120 |
| Control | 79.51[a] | 79.30 | 79.19 | 78.86 | 79.31 |
| DH42 | 79.69[a] | 78.94 | 79.14 | 77.00 | 79.70 |
| P42 | 79.09[a] | 78.97 | 79.02 | 78.28 | 79.21 |
| LAB | 78.98[a] | 79.05 | 79.24 | 78.55 | 79.17 |
| DH42 + LAB | 78.80[a] | 78.94 | 78.60 | 78.94 | 78.86 |
| P42 + LAB | 78.81[a] | 79.64 | 79.42 | 78.96 | 78.90 |
| DH42 + P42 | 79.02[a] | 78.94 | 79.21 | 79.00 | 79.85 |
| DH42 + LAB + P42 | 77.42[b] | 78.88 | 78.48 | 78.26 | 78.93 |
| S.E.M. | 0.18 | 0.61 | 0.29 | 0.52 | 0.28 |

*DH42 and P42 are propionic acid-producing bacteria; LAB is lactic acid-producing bacteria.
[a,b]Means within a column with unlike superscripts differ ($P < 0.05$).

Initial dry matter was lowest ($P<0.05$) in the corn treated with the three inoculants due to the added moisture from the inoculants. Differences among treatments throughout the ensilement period were similar. Dry matter recovery (Table 7) was high for all treatments ranging from 96.03–100%.

TABLE 7

Effect of inoculant treatments on dry matter recovery (%) at different ensilement periods.

| Treatment* | Ensilement period (d) | | | |
|---|---|---|---|---|
| | 4 | 8 | 90 | 120 |
| Control | 99.55 | 99.47 | 98.82 | 99.36[a] |
| DH42 | 99.07 | 99.99 | 96.30 | 99.83[a] |
| P42 | 99.56 | 99.55 | 98.30 | 99.83[a] |
| LAB | 99.63 | 99.86 | 99.11 | 99.84[a] |
| DH42 + LAB | 99.58 | 99.39 | 98.06 | 96.03[b] |
| P42 + LAB | 99.28 | 100.00 | 99.83 | 93.73[b] |
| DH42 + P42 | 99.16 | 99.65 | 99.50 | 96.11[b] |
| DH42 + LAB + P42 | 99.70 | 99.90 | 99.81 | 100.00[a] |
| S.E.M. | 0.46 | 0.36 | 0.87 | 0.71 |

*DH42 and P42 are propionic acid-producing bacteria; LAB is lactic acid-producing bacteria.
[a,b]Means within a column with unlike superscripts differ ($P < 0.05$).

On day 120, the silage treated with the combinations of the two inoculants had the lowest ($P<0.05$) DM recovery.

As shown in Table 8, pH decreased during the ensilement period.

TABLE 8

Effect of inoculant treatments on pH of HMC at different ensilement periods.

| Treatment* | Ensilement period (d) | | | | |
|---|---|---|---|---|---|
| | 0 | 4 | 8 | 90 | 120 |
| Control | 5.33 | 5.17 | 5.13 | 5.32[a] | 5.07[a] |
| DH42 | 5.37 | 5.33 | 4.83 | 4.98[ab] | 4.85[ab] |
| P42 | 5.23 | 5.17 | 4.97 | 5.22[ab] | 4.99[ab] |
| LAB | 5.37 | 5.33 | 4.97 | 5.03[ab] | 5.01[ab] |
| DH42 + LAB | 5.33 | 5.23 | 4.87 | 4.78[b] | 4.75[b] |
| P42 + LAB | 5.33 | 5.27 | 5.17 | 5.27[ab] | 4.87[ab] |

TABLE 8-continued

Effect of inoculant treatments on pH of HMC at different ensilement periods.

| Treatment* | Ensilement period (d) | | | | |
|---|---|---|---|---|---|
| | 0 | 4 | 8 | 90 | 120 |
| DH42 + P42 | 5.37 | 5.27 | 5.20 | 4.85[ab] | 4.87[ab] |
| DH42 + LAB + P42 | 5.30 | 5.30 | 4.77 | 4.85[ab] | 4.74[b] |
| S.E.M. | 0.03 | 0.04 | 0.15 | 0.10 | 0.06 |

*DH42 and P42 are propionic acid-producing bacteria; LAB is lactic acid-producing bacteria.
[ab]Means within a column with unlike superscripts differ (P < 0.05).

On day 8, slightly lower pH values were observed in the HMC inoculated with DH42 (4.83), its combination with LAB (4.87) and the combination of the three inoculants (4.77). After 120 days of ensilement, the combinations of DH42 with LAB had lower (P<0.05) pH values than the control. For most of the treatments, a slight increase in pH was noted after 90 days. This coincided with a decrease in lactic (Table 9) and acetic acid (Table 10) levels.

TABLE 9

Effect of inoculant treatments on lactic acid content (mg/100 g DM) of silage at different ensilement periods.

| Treatment* | Ensilement period (d) | | | | |
|---|---|---|---|---|---|
| | 0 | 4 | 8 | 90 | 120 |
| Control | 0 | 0 | 52[ab] | 0 | 0 |
| DH42 | 0 | 0 | 0[b] | 30 | 0 |
| P42 | 0 | 0 | 60[ab] | 1 | 49 |
| LAB | 72 | 0 | 105[ab] | 60 | 61 |
| DH42 + LAB | 0 | 0 | 234[ab] | 1 | 8 |
| P42 + LAB | 0 | 0 | 267[a] | 5 | 71 |
| DH42 + P42 | 0 | 0 | 92[ab] | 13 | 0 |
| DH42 + LAB + P42 | 0 | 10 | 136[ab] | 31 | 38 |
| S.E.M. | 9 | 1 | 45 | 26 | 32 |

*DH42 and P42 are propionic acid-producing bacteria; LAB is lactic acid-producing bacteria.
[ab]Means within a column with unlike superscripts differ (P < 0.05).

TABLE 10

Effect of inoculant treatments on acetic acid (mg/100 g DM) content of HMC at different ensilement periods.

| Treatment* | Ensilement period (d) | | | | |
|---|---|---|---|---|---|
| | 0 | 4 | 8 | 90 | 120 |
| Control | 12 | 0 | 165 | 43[b] | 183 |
| DH42 | 0 | 11 | 47 | 58[ab] | 202 |
| P42 | 12 | 6 | 14 | 46[b] | 205 |
| LAB | 10 | 0 | 89 | 61[ab] | 214 |
| DH42 + LAB | 9 | 16 | 141 | 79[ab] | 312 |
| P42 + LAB | 0 | 7 | 196 | 48[b] | 201 |
| DH42 + P42 | 11 | 0 | 205 | 60[ab] | 238 |
| DH42 + LAB + P42 | 0 | 7 | 209 | 91[a] | 141 |
| S.E.M. | 9 | 7 | 44 | 8 | 39 |

*DH42 and P42 are propionic acid-producing bacteria; LAB is lactic acid-producing bacteria.
[ab]Means within a column with unlike superscripts differ (P < 0.05).

No detectable amounts of lactic acid were noted through day 4 except for the corn inoculated with LAB. Some of this lactic acid may have originated from the starter culture medium since the cells were not washed. Lactic acid levels were highest on day 8. Lactic acid levels were similar after day 120 of ensilement. Acetic acid peaked on day 120 but significant differences (P<0.05) among treatments were noted only on day 90. The silage treated with the three inoculants had higher (P<0.05) acetic acid than the control on day 90.

Propionic acid was not detected in any of the samples at day 8 or earlier. On day 90, greater amounts of propionic acid (Table 11) were observed in HMC treated with DH42+LAB and DH42+LAB+P42 which matched the trend in acetic acid levels.

TABLE 13

Effect of inoculant treatments on propionic acid content (mg/100 g) of HMC at different ensilement periods.

| Treatment* | Ensilement period (d) | | | | |
|---|---|---|---|---|---|
| | 0 | 4 | 8 | 90 | 120 |
| Control | 0 | 0 | 0 | 10[c] | 17[b] |
| DH42 | 0 | 0 | 0 | 22[abc] | 54[ab] |
| P42 | 0 | 0 | 0 | 12[c] | 14[b] |
| LAB | 0 | 0 | 0 | 28[abc] | 31[b] |
| DH42 + LAB | 0 | 0 | 0 | 50[a] | 91[a] |
| P42 + LAB | 0 | 0 | 0 | 13[bc] | 17[b] |
| DH42 + P42 | 0 | 0 | 0 | 38[abc] | 56[ab] |
| DH42 + LAB + P42 | 0 | 0 | 0 | 47[ab] | 43[ab] |
| S.E.M. | | | | 7 | 11 |

*DH42 and P42 are propionic acid-producing bacteria; LAB is lactic acid-producing bacteria.
[abc]Means within a column with unlike superscripts differ (P < 0.05).

This was expected since acetate and propionate are end-products from fermentation of glucose and lactate (Hettinga, D. H. and G. W. Reinbold, J. Milk Food Technol. 35:295–301 (1972)). The propionic acid in the P42-inoculated silages was comparable to the control.

Initial glucose content of the corn (Table 12) was highest (P<0.05) in the control.

TABLE 12

Effect of inoculant treatments on glucose content (mg/100 g DM) of HMC at different ensilement periods.

| Treatment* | Ensilement period (d) | | | | |
|---|---|---|---|---|---|
| | 0 | 4 | 8 | 90 | 120 |
| Control | 249[a] | 104 | 1 | 7 | 2 |
| DH42 | 157[ab] | 87 | 43 | 7 | 19 |
| P42 | 150[ab] | 116 | 38 | 2 | 16 |
| LAB | 89[b] | 90 | 41 | 18 | 6 |
| DH42 + LAB | 107[ab] | 98 | 22 | 6 | 23 |
| P42 + LAB | 105[ab] | 79 | 0 | 3 | 13 |
| DH42 + P42 | 82[b] | 111 | 0 | 87 | 19 |
| DH42 + LAB + P42 | 153[ab] | 85 | 0 | 7 | 7 |
| S.E.M. | 32 | 19 | 18 | 26 | 5 |

*DH42 and P42 are propionic acid producing bacteria; LAB is lactic acid-producing bacteria.
[ab]Means within a column with unlike superscripts differ (P < 0.05).

On day 120, all treatments had residual glucose ranging from 0.002–0.023%. Malic acid (Table 13) was also detected on day 0 and day 8 but not in the latter stages of ensilement.

TABLE 13

Effect of inoculant treatments on malic acid content (mg/100 g DM) of HMC at different ensilement periods.

| Treatment* | Ensilement period (d) | | | | |
|---|---|---|---|---|---|
| | 0 | 4 | 8 | 90 | 120 |
| Control | 332[a] | 0 | 7 | 0 | 0 |
| DH42 | 152[ab] | 0 | 63 | 0 | 0 |
| P42 | 124[ab] | 0 | 36 | 0 | 0 |
| LAB | 54[b] | 0 | 4 | 0 | 0 |
| DH42 + LAB | 79[b] | 0 | 14 | 0 | 0 |
| P42 + LAB | 56[b] | 0 | 0 | 0 | 0 |
| DH42 + P42 | 30[c] | 0 | 0 | 0 | 0 |
| DH + LAB + P42 | 140[ab] | 0 | 0 | 0 | 0 |
| S.E.M. | 48 | | 18 | | |

*DH42 and P42 are propionic acid-producing bacteria; LAB is lactic acid-producing bacteria.
[ab]Means within a column with unlike superscripts differ (P < 0.05).

This suggests that malic acid was used as a substrate during fermentation. The control had the highest (P<0.05) malic acid content at day 0. While the day 0 samples were refrigerated until the time that extracts were taken for analysis (within 2 hours), it is possible that some fermentation in the treated HMC occurred accounting for the lower glucose and malic acid contents than those found in the uninoculated corn (control). Ethanol (Table 14) levels increased throughout the ensilement period, but significant differences among treatments were detected only on day 120.

TABLE 14

Effect of inoculant treatments on ethanol content (mg/100 g DM) of HMC at different ensilement periods.

| Treatment* | Ensilement period (d) | | | | |
|---|---|---|---|---|---|
| | 0 | 4 | 8 | 90 | 120 |
| Control | 0 | 127 | 239 | 329 | 635[ab] |
| DH42 | 0 | 127 | 205 | 312 | 746[ab] |
| P42 | 0 | 137 | 250 | 261 | 816[a] |
| LAB | 0 | 131 | 252 | 280 | 691[ab] |
| DH42 + LAB | 0 | 139 | 228 | 239 | 647[ab] |
| P42 + LAB | 0 | 133 | 255 | 288 | 801[a] |
| DH42 + P42 | 0 | 122 | 238 | 265 | 675[ab] |
| DH42 + LAB + P42 | 0 | 134 | 288 | 250 | 332[b] |
| S.E.M. | | 8 | 26 | 26 | 93 |

*DH42 and P42 are propionic acid-producing bacteria; LAB is lactic acid-producing bacteria.
[ab]Means within a column with unlike superscripts differ (P < 0.05).

It appeared that P42 tended to increase ethanol content (P42 and P42+LAB; P<0.05) except when added in combination with DH42.

Coliform (Table 15) counts from day 0–4 were viable. Except for the control, coliform numbers decreased on day 8. No coliform bacteria were detected on day 90 and 120 as expected. Coliform are aerobic organisms and are usually present during the early stages of ensilement.

TABLE 15

Effect of treatments on the coliform numbers (log cfu/g DM) of HMC at different ensilement periods.

| Treatment* | Ensilement period (d) | | | | |
|---|---|---|---|---|---|
| | 0 | 4 | 8 | 90 | 120 |
| Control | 7.06 | 7.65 | 7.82 | 0 | 0 |
| DH42 | 7.86 | 7.85 | 5.69 | 0 | 0 |
| P42 | 4.67 | 7.41 | 6.68 | 0 | 0 |
| LAB | 7.48 | 7.16 | 6.31 | 0 | 0 |
| DH42 + LAB | 7.85 | 8.64 | 6.10 | 0 | 0 |
| P42 + LAB | 8.18 | 7.38 | 6.45 | 0 | 0 |
| DH42 + P42 | 7.08 | 7.37 | 6.38 | 0 | 0 |
| DH42 + LAB + P42 | 8.35 | 7.83 | 5.64 | 0 | 0 |
| S.E.M. | 0.779 | 0.379 | 0.628 | | |

*DH42 and P42 are propionic acid-producing bacteria; LAB is lactic acid-producing bacteria.
Means within a column with unlike superscripts differ (P < 0.05).

Yeasts and molds (Table 16) persisted throughout the ensilement period but decreased on day 120. As with the other parameters evaluated, significant differences among treatments were not detected possibly due to the large variability among replicates. Numerically, the HMC that received DH42 tended to have fewer yeasts and molds.

TABLE 16

Effect of inoculant treatments on the number of yeasts and molds (log cfu/g DM) of HMC at different ensilement periods.

| Treatment* | Ensilement period (d) | | | | |
|---|---|---|---|---|---|
| | 0 | 4 | 8 | 90 | 120 |
| Control | 6.62 | 7.25 | 6.75 | 6.64 | 4.00 |
| DH42 | 5.95 | 7.95 | 7.56 | 4.71 | 0.84 |
| P42 | 5.84 | 7.37 | 6.57 | 5.79 | 3.98 |
| LAB | 5.67 | 6.52 | 6.17 | 6.48 | 2.47 |
| DH42 + LAB | 6.03 | 7.60 | 6.57 | 3.80 | 2.56 |
| P42 + LAB | 4.87 | 7.67 | 6.82 | 5.74 | 3.73 |
| DH42 + P42 | 3.50 | 6.71 | 7.56 | 6.21 | 0.91 |
| DH42 + LAB + P42 | 4.58 | 7.64 | 6.46 | 1.82 | 1.93 |
| S.E.M. | 1.18 | 0.51 | 0.40 | 1.39 | 0.71 |

*DH42 and P42 are propionic acid-producing bacteria; LAB is lactic acid producing bacteria.
Means within a column with unlike superscripts differ (P < 0.05).

In spite of the low levels of lactic acid found, the number of lactic acid producing bacteria (Table 17) were high in all treatments. At day 8, LAB+P42-inoculated silage had more LAB ($3.8 \times 10^9$ cfu/g DM) than control ($3.55 \times 10^6$ cfu/g DM) or DH42-treated silage ($5.01 \times 10^7$ cfu/g DM). On day 90 and 120, LAB counts were similar for all treatments.

TABLE 17

Effect of inoculant treatments on the number of lactic acid-producing bacteria (log cfu/g DM) at different ensilement periods.

| Treatment* | Ensilement period (d) | | | | |
|---|---|---|---|---|---|
| | 0 | 4 | 8 | 90 | 120 |
| Control | 3.48 | 6.70 | 6.55[c] | 8.70 | 8.01 |
| DH42 | 5.25 | 6.19 | 7.70[bc] | 8.43 | 7.60 |
| P42 | 6.16 | 6.93 | 7.88[abc] | 8.86 | 8.09 |
| LAB | 5.55 | 7.44 | 7.90[abc] | 8.64 | 7.73 |
| DH42 + LAB | 5.07 | 8.09 | 9.17[ab] | 7.49 | 7.62 |
| P42 + LAB | 5.24 | 7.76 | 9.58[a] | 8.50 | 8.03 |

TABLE 17-continued

Effect of inoculant treatments on the number of lactic acid-producing bacteria (log cfu/g DM) at different ensilement periods.

| Treatment* | Ensilement period (d) | | | | |
|---|---|---|---|---|---|
| | 0 | 4 | 8 | 90 | 120 |
| DH42 + P42 | 4.52 | 4.41 | 8.51[ab] | 7.80 | 7.77 |
| DH42 + LAB + P42 | 5.11 | 7.30 | 9.18[ab] | 8.55 | 7.55 |
| S.E.M. | 0.76 | 0.99 | 0.34 | 0.29 | 0.18 |

*DH42 and P42 are propionic acid-producing bacteria; LAB is lactic acid-producing bacteria.
[abc]Means within a column with unlike superscripts differ ($P < 0.05$).

Table 18 shows the PAPB enumeration of HMC. The silages treated with the two PAPB's and the three inoculant-combination had the highest ($P<0.05$) initial PAPB counts with $10^5$ cfu/g DM. Until day 8, the corn inoculated with P42, LAB and the control had no PAPB ($P<0.05$). In the latter period of ensilement, PAPB counts were high but the differences among treatments were not significant. The PAPB counts should be used with caution since a later validation study showed that P42 will not ferment erythritol. Considering this, it is probable that the counts for P42-treated corn were underestimated particularly during the early phase of ensilement.

TABLE 18

Effect of inoculant treatments on the number of propionic acid-producing bacteria (log cfu/g DM) at different ensilement periods.

| Treatment | Ensilement period (d) | | | | |
|---|---|---|---|---|---|
| | 0 | 4 | 8 | 90 | 120 |
| Control | 0[c] | 0 | 0[b] | 7.77 | 6.77 |
| DH42 | 3.43[ab] | 3.73 | 1.03[ab] | 6.45 | 9.10 |
| P42 | 0.70[c] | 0 | 0[b] | 6.44 | 5.40 |
| LAB | 0[c] | 0 | 0[b] | 5.44 | 8.43 |
| DH42 + LAB | 4.44[ab] | 2.07 | 4.10[a] | 8.13 | 7.77 |
| P42 + LAB | 2.07[bc] | 0 | 1.03[ab] | 5.44 | 4.44 |
| DH42 + P42 | 5.10[a] | 4.77 | 2.07[ab] | 7.46 | 6.43 |
| DH42 + LAB + P42 | 5.11[a] | 2.74 | 2.41[ab] | 6.44 | 5.77 |
| S.E.M. | 0.50 | 1.01 | 0.82 | 1.33 | 1.44 |

*DH42 and P42 are propionic acid-producing bacteria; LAB is lactic acid-producing bacteria.
[abc]Means within a column with unlike superscripts differ ($P < 0.05$).

Aerobic stability. Upon exposure to air, all treatments appeared to be stable. No heating was observed (Table 19) and pH (Table 20) levels were maintained. Lowest ($P<0.05$) pH levels were noted in HMC that was treated with DH42.

TABLE 19

Effect of inoculant treatment on the HMC temperature (° C.) during aerobic exposure.

| Treatment* | Aerobic exposure (d) | | | | | |
|---|---|---|---|---|---|---|
| | 0 | 1 | 2 | 3 | 4 | 5 |
| Control | 22.65 | 21.74 | 21.29 | 21.55 | 21.56 | 20.85 |
| DH42 | 22.02 | 20.93 | 21.11 | 21.11 | 20.93 | 21.11 |
| P42 | 22.59 | 21.67 | 21.11 | 21.20 | 20.56 | 20.93 |
| LAB | 22.78 | 21.85 | 21.67 | 21.67 | 21.67 | 20.93 |
| DH42 + LAB | 22.22 | 20.93 | 20.83 | 20.83 | 20.19 | 20.37 |
| P42 + LAB | 21.67 | 20.41 | 20.46 | 20.56 | 20.00 | 20.19 |
| DH42 + P42 | 21.85 | 21.11 | 20.84 | 20.93 | 20.56 | 20.37 |

TABLE 19-continued

Effect of inoculant treatment on the HMC temperature (° C.) during aerobic exposure.

| Treatment* | Aerobic exposure (d) | | | | | |
|---|---|---|---|---|---|---|
| | 0 | 1 | 2 | 3 | 4 | 5 |
| DH42 + LAB + P42 | 22.91 | 22.04 | 21.61 | 21.83 | 21.35 | 21.17 |
| S.E.M. | 0.37 | 0.48 | 0.59 | 0.62 | 0.46 | 0.45 |

*DH42 and P42 are propionic acid-producing bacteria; LAB is lactic acid-producing bacteria.
Means within a column with unlike superscripts differ ($P < 0.05$).

TABLE 20

Effect of inoculant treatments on pH of HMC during aerobic exposure.

| Treatment* | Aerobic exposure (d) | | | |
|---|---|---|---|---|
| | 0 | 1 | 3 | 5 |
| Control | 5.07[a] | 5.05[a] | 5.00[a] | 5.09[abc] |
| DH42 | 4.85[ab] | 4.91[ab] | 4.88[ab] | 4.91[bc] |
| P42 | 4.99[ab] | 4.98[ab] | 4.98[ab] | 5.22[a] |
| LAB | 5.01[ab] | 4.99[ab] | 4.77[ab] | 5.11[ab] |
| DH42 + LAB | 4.75[b] | 4.82[ab] | 4.75[ab] | 4.88[c] |
| P42 + LAB | 4.87[ab] | 4.87[ab] | 4.86[ab] | 5.08[abc] |
| DH42 + P42 | 4.87[ab] | 4.87[ab] | 4.86[ab] | 5.01[abc] |
| DH42 + LAB + P42 | 4.74[b] | 4.75[b] | 4.74[b] | 4.93[bc] |
| S.E.M. | 0.06 | 0.06 | 0.05 | 0.04 |

*DH42 and P42 are propionic acid-producing bacteria; LAB is lactic acid-producing bacteria.
[abc]Means within a column with unlike superscripts differ ($P < 0.05$).

Dry matter content (Table 21) of HMC increased as length of exposure increased. DM ranged from 78.86–83.24%. Differences among treatments were not significant.

TABLE 21

Changes in dry matter content (%) of HMC during aerobic exposure.

| Treatment* | Aerobic exposure (d) | | | |
|---|---|---|---|---|
| | 0 | 1 | 3 | 5 |
| Control | 79.31 | 80.40 | 81.50 | 83.10 |
| DH42 | 79.70 | 80.61 | 82.10 | 83.24 |
| P42 | 79.21 | 79.86 | 81.20 | 82.18 |
| LAB | 79.17 | 79.92 | 81.31 | 82.05 |
| DH42 + LAB | 78.86 | 79.39 | 80.76 | 81.78 |
| P42 + LAB | 78.90 | 80.13 | 80.82 | 82.54 |
| DH42 + P42 | 79.85 | 81.01 | 81.20 | 82.36 |
| DH42 + LAB + P42 | 78.93 | 80.69 | 80.60 | 82.80 |
| S.E.M. | 0.28 | 0.40 | 0.40 | 0.39 |

*DH42 and P42 are propionic acid-producing bacteria; LAB is lactic acid-producing bacteria.
Means within a column with unlike superscripts differ ($P < 0.05$).

No appreciable changes in the lactic acid (Table 22) levels were noted when the HMC samples were exposed to air.

TABLE 22

Effect of inoculant treatments on lactic acid content (mg/100 g DM) of HMC during aerobic exposure.

| Treatment* | Aerobic exposure (d) | | | |
|---|---|---|---|---|
| | 0 | 1 | 3 | 5 |
| Control | 0 | 0 | 0 | 2 |
| DH42 | 0 | 3 | 1 | 1 |

TABLE 22-continued

Effect of inoculant treatments on lactic acid content (mg/100 g DM) of HMC during aerobic exposure.

| Treatment* | Aerobic exposure (d) | | | |
|---|---|---|---|---|
| | 0 | 1 | 3 | 5 |
| P42 | 49 | 42 | 43 | 29 |
| LAB | 61 | 35 | 30 | 23 |
| DH42 + LAB | 8 | 10 | 0 | 0 |
| P42 + LAB | 71 | 57 | 82 | 67 |
| DH42 + P42 | 0 | 0 | 0 | 0 |
| DH42 + LAB + P42 | 38 | 42 | 40 | 42 |
| S.E.M. | 32 | 26 | 26 | 18 |

*DH42 and P42 are propionic acid-producing bacteria; LAB is lactic acid-producing bacteria.
Means within a column with unlike superscripts differ (P < 0.05).

Acetic acid (Table 23) levels decreased on day 1 in all treatments but were unchanged thereafter.

TABLE 23

Effect of inoculant treatments on acetic acid content (mg/100 g DM) of HMC during aerobic exposure.

| Treatment* | Aerobic exposure (d) | | | |
|---|---|---|---|---|
| | 0 | 1 | 3 | 5 |
| Control | 183 | 58$^{abc}$ | 55$^b$ | 53$^{abc}$ |
| DH42 | 202 | 60$^{abc}$ | 64$^{ab}$ | 57$^{abc}$ |
| P42 | 205 | 59$^{bc}$ | 56$^b$ | 35$^c$ |
| LAB | 214 | 47$^c$ | 52$^b$ | 50$^{bc}$ |
| DH42 + LAB | 312 | 93$^a$ | 82$^a$ | 83$^a$ |
| P42 + LAB | 201 | 51$^{bc}$ | 55$^b$ | 47$^{bc}$ |
| DH42 + P42 | 238 | 66$^{ab}$ | 58$^b$ | 60$^{abc}$ |
| DH42 + LAB + P42 | 141 | 78$^{ab}$ | 82$^a$ | 73$^{ab}$ |
| S.E.M. | 39 | 8 | 4 | 6 |

*DH42 and P42 are propionic acid-producing bacteria; LAB is lactic acid-producing bacteria.
$^{abc}$Means within a column with unlike superscripts differ (P < 0.05).

After 5 days of aerobic exposure, P42 had less (P<0.05) acetic acid than DH42+LAB and DH42+P42+LAB. HMC that received DH42 as a starter culture had higher propionic acid levels (Table 24) through the exposure period.

TABLE 24

Effect of inoculant treatments on propionic acid content (mg/100 g DM) of HMC during aerobic exposure.

| Treatment* | Aerobic exposure (d) | | | |
|---|---|---|---|---|
| | 0 | 1 | 3 | 5 |
| Control | 17$^b$ | 19$^b$ | 17$^b$ | 17$^b$ |
| DH42 | 54$^{ab}$ | 47$^{ab}$ | 50$^{ab}$ | 46$^{ab}$ |
| P42 | 14$^b$ | 12$^b$ | 15$^b$ | 9$^b$ |
| LAB | 31$^b$ | 17$^b$ | 18$^b$ | 13$^b$ |
| DH42 + LAB | 91$^a$ | 84$^a$ | 66$^a$ | 74$^a$ |
| P42 + LAB | 17$^b$ | 10$^b$ | 12$^b$ | 11$^b$ |
| DH42 + P42 | 56$^{ab}$ | 44$^b$ | 37$^{ab}$ | 40$^{ab}$ |
| DH42 + LAB + P42 | 43$^{ab}$ | 43$^b$ | 41$^{ab}$ | 37$^{ab}$ |
| S.E.M. | 11 | 8 | 8 | 11 |

*DH42 and P42 are propionic acid-producing bacteria; LAB is lactic acid-producing bacteria.
$^{ab}$Means within a column with unlike superscripts differ (P < 0.05).

All treatments had residual glucose (Table 25) until day 3. On day 5, increased glucose levels were noted in HMC treated with DH42. Ethanol content (Table 26) in all treatments decreased over time.

TABLE 25

Effect of inoculant treatments on glucose content (mg/100 g DM) of HMC during aerobic exposure.

| Treatment* | Aerobic exposure (d) | | | |
|---|---|---|---|---|
| | 0 | 1 | 3 | 5 |
| Control | 2 | 8 | 4$^b$ | 1$^{bc}$ |
| DH42 | 19 | 26 | 23$^a$ | 38$^a$ |
| P42 | 16 | 8 | 5b | 0$^c$ |
| LAB | 6 | 2 | 0$^b$ | 0$^c$ |
| DH42 + LAB | 23 | 19 | 12$^{ab}$ | 29$^{abc}$ |
| P42 + LAB | 13 | 5 | 0$^b$ | 5$^{abc}$ |
| DH42 + P42 | 19 | 23 | 13$^{ab}$ | 34$^{ab}$ |
| DH42 + LAB + P42 | 7 | 5 | 9$^{ab}$ | 19$^{abc}$ |
| S.E.M. | 5 | 7 | 4 | 7 |

*DH42 and P42 are propionic acid-producing bacteria; LAB is lactic acid-producing bacteria.
$^{abc}$Means within a column with unlike superscripts differ (P < 0.05).

TABLE 26

Effect of inoculant treatments on ethanol content (mg/100 g DM) of HMC during aerobic exposure.

| Treatment* | Aerobic exposure (d) | | | |
|---|---|---|---|---|
| | 0 | 1 | 3 | 5 |
| Control | 635$^{ab}$ | 165 | 127 | 107 |
| DH42 | 746$^{ab}$ | 189 | 157 | 144 |
| P42 | 816$^a$ | 177 | 127 | 70 |
| LAB | 691$^{ab}$ | 134 | 113 | 74 |
| DH42 + LAB | 647$^{ab}$ | 143 | 131 | 102 |
| P42 + LA8 | 801$^a$ | 186 | 141 | 71 |
| DH42 + P42 | 675$^{ab}$ | 171 | 132 | 112 |
| DH42 + LAB + P42 | 332$^b$ | 160 | 151 | 109 |
| S.E.M. | 93 | 18 | 18 | 32 |

*DH42 and P42 are propionic acid-producing bacteria; LAB is lactic acid-producing bacteria.
$^{ab}$Means within a column with unlike superscripts differ (P < 0.05).

A general declining trend in microbial counts with aerobic exposure was noted. LAB and PAPB counts are shown in Tables 27 and 28.

TABLE 27

Effect of inoculant treatments on the number of lactic acid-producing bacteria (log cfu/g DM) in HMC during aerobic exposure.

| Treatment* | Aerobic exposure (d) | | | |
|---|---|---|---|---|
| | 0 | 1 | 3 | 5 |
| Control | 8.01 | 7.73$^{ab}$ | 7.15 | 6.89 |
| DH42 | 7.60 | 7.62$^{ab}$ | 6.95 | 6.71 |
| P42 | 8.09 | 7.97$^a$ | 7.34 | 6.25 |
| LAB | 7.73 | 7.65$^{ab}$ | 7.24 | 6.91 |
| DH42 + LAB | 7.62 | 7.87$^{ab}$ | 7.01 | 6.98 |
| P42 + LAB | 8.03 | 7.99$^a$ | 7.46 | 7.11 |
| DH42 + P42 | 7.77 | 7.90$^{ab}$ | 6.97 | 6.76 |
| DH42 + LAB + P42 | 7.55 | 7.34$^b$ | 6.91 | 6.88 |
| S.E.M. | 0.18 | 0.13 | 0.12 | 0.25 |

*DH42 and P42 are propionic acid-producing bacteria; LAB is lactic acid-producing bacteria.
$^{ab}$Means within a column with unlike superscripts differ (P < 0.05)

TABLE 28

Effect of inoculant treatments on the number of propionic acid-producing bacteria (log cfu/g DM) in HMC during aerobic exposure.

| | Aerobic exposure (d) | | | |
|---|---|---|---|---|
| Treatment* | 0 | 1 | 3 | 5 |
| Control | 6.77 | 6.09 | 5.09$^{abc}$ | 2.75 |
| DH42 | 9.10 | 5.43 | 4.75$^{abc}$ | 2.08 |
| P42 | 5.40 | 5.76 | 3.76$^{bc}$ | 2.42 |
| LAB | 8.43 | 5.43 | 4.76$^{abc}$ | 1.39 |
| DH42 + LAB | 7.77 | 7.77 | 7.76$^{a}$ | 2.42 |
| P42 + LAB | 4.44 | 4.10 | 5.76$^{abc}$ | 2.42 |
| DH42 + P42 | 6.43 | 7.09 | 7.09$^{ab}$ | 1.39 |
| DH42 + LAB + P42 | 5.77 | 4.43 | 2.76$^{c}$ | 0.69 |
| S.E.M. | 1.44 | 0.96 | 0.77 | 0.52 |

*DH42 and P42 are propionic acid-producing bacteria; LAB is lactic acid-producing bacteria.
$^{abc}$Means within a column with unlike superscripts differ ($P < 0.05$).

Only small differences among treatments were noted.

Yeast and mold numbers (Table 29) decreased in most treatments. Over the 5-day exposure period, yeasts and molds were lowest for treatments that contained LAB or DH42.

TABLE 29

Effect of inoculant treatments on the number of yeast and molds (cfu/g DM) in HMC during aerobic exposure.

| | Aerobic exposure (d) | | | |
|---|---|---|---|---|
| Treatment* | 0 | 1 | 3 | 5 |
| Control | 4.00 | 3.71$^{a}$ | 2.72 | 2.59$^{ab}$ |
| DH42 | 0.84 | 2.05$^{ab}$ | 0.93 | 1.19$^{ab}$ |
| P42 | 3.98 | 3.84$^{a}$ | 2.91 | 4.74$^{a}$ |
| LAB | 2.47 | 3.02$^{ab}$ | 2.46 | 1.73$^{ab}$ |
| DH42 + LAB | 2.56 | 0.90$^{ab}$ | 1.13 | 0$^{b}$ |
| P42 + LAB | 3.73 | 2.25$^{ab}$ | 0 | 0$^{b}$ |
| DH42 + P42 | 0.91 | 0$^{b}$ | 0 | 0$^{b}$ |
| DH42 + LAB + P42 | 1.93 | 1.33$^{ab}$ | 0 | 0$^{b}$ |
| S.E.M. | 0.71 | 0.67 | 0.99 | 0.76 |

*DH42 and P42 are propionic acid-producing bacteria; LAB is lactic acid-producing bacteria.
$^{ab}$Means within a column with unlike superscripts differ ($P < 0.05$).

DISCUSSION

In comparison with earlier reports (Dawson, T., Propionic acid-producing bacteria as bioinoculants for the preservation of ensiled, high-moisture corn, Ph.D. Thesis. Michigan State University, East Lansing, Mich. (1994); Wardynski, F. A., et al., J. Anim. Sci. 71:2246 (1993); Faber, D. A., et al., J. Dairy Sci. 71:1234–1242 (1989)), the concentrations of fermentation end-products observed in this Example were low. The high dry matter content of the corn appeared to limit microbial activity. In a study by Wardynski (Wardynski, F. A., Effects of microbial cultures and various other additives on the feeding quality, fermentation pattern, dry matter recovery and aerobic stability of high moisture corn. M.S. Thesis. Michigan State University, East Lansing, Mich. (1991)), lactic acid decreased by 80% and acetic acid by 92% as DM content of high moisture corn increased from 63.4 to 78.1%. In a similar study, Faber et al (Faber, D. A., et al., J. Dairy Sci. 72:1234–1242 (1989)) observed that lower DM corn fermented more, had higher concentrations of lactic acid, acetic acid and lower pH compared to high DM corn. It would be noted however, that the growth of lactic acid-producing bacteria was not restricted. Greenhill (as cited by Woolford, M. K., The Silage Fermentation. Microbiology Series. Vol 14. Marcel Decker: New York (1984)) concluded that lactic acid fermentation can be limited by substrate availability and moisture level. LAB were found to be tolerant of high DM conditions.

Considering the limitations of analyses of PAPB, the results were comparable to those observed by Flores-Galarza et al. Since propionic acid levels were low, it is evident that other factors had contributed to the poor performance of the PAPB, especially P42. The adverse effect of pH on P42 cannot be discounted. The optimum pH for growth of propionibacteria is between 6.5–7.0 with the upper limit as optimum for propionic acid production (Tittsler and Whittier, and Sherman as cited by Hettinga and Reinbold, J. Milk Food Technol. 35:295–301 (1972)). This pH range is higher than that normally found in silage. Since DH42 was isolated from ensiled HMC, it is assumed that it is more adapted to an acidic environment. The high dry matter content of the HMC is another factor that may have limited PAPB growth.

Despite the lower levels of lactic, acetic and propionic acids, and the variability within treatments, it appeared that the two- and three-way combination of DH42 were better than any of the other treatments. Upon aerobic exposure, this trend continued with higher propionic acid levels and less yeasts and molds. Increased glucose levels were also noted after five days of aerobic exposure. Phillip and Fellner (J. Anim. Sci. 70:3178–3187 (1992)) also noted an increase in residual water soluble carbohydrates in HMC inoculated with *B. subtilis* after seven days of aerobic exposure. The increase in glucose could have arisen from the breakdown of structural carbohydrates. As Woolford (The Silage Fermentation. Microbiology Series. Vol. 14. Marcel Decker: New York (1984)) indicated, hemicellulose can act as a reservoir of fermentable sugars which can be broken down by microbial activity and acid hydrolysis.

Many studies have evaluated the interaction of propionibacteria and lactobacilli (Lee et al, Biotech. and Bioeng. 18:513–526 (1976); Liu and Moon, App. Environ. Microbiol. 44:715–722 (1982); Parker and Moon, J. Food Prot. 45:326 (1982)) and the ability of lactobacilli to enhance propionic acid formation by propionic acid-producing bacteria (Javainen and Linko, J. Cereal Sci. 18:75–88 (1993)). Results of the current study support these observations. Perez-Chaia et al (J. App. Bact. 77:134–139 (1994) ), however found that high levels of propionate could inhibit the growth of lactobacilli when the medium contains a growth-limiting glucose concentration. In support of this observation, LAB counts appeared to be lower in HMC with higher propionic acid content.

EXAMPLE 3

In silage, the benefits of propionic acid treatment has been demonstrated. Propionic acid has antifungal properties, hence can help in preserving silage quality particularly during aerobic exposure. One drawback for its use is that it is corrosive, making it difficult to handle. The use of propionic acid-producing bacteria (PAB) like the Propionibacteria sp. appears a viable alternative. This study evaluated the effects of two propionibacterial strains (DH42 and Pioneer) as inoculants, and the moisture content of the corn.
Methodology Silage was prepared using corn of different dry matter contents: A (64.79% DM), B (67–06%), C (72.08%), D (75.90%), E (76.89%) and E (78.07%). Corn was rolled prior to ensilement.

The Pioneer inoculant was purchased from American Type Culture Collection (ATCC 53962). Both inoculants were grown in Reinforced Clostridial Medium (Unipath, England) anaerobically and incubated at 39° C. for about 18 hours before use. Treatments were: control (sterile distilled water), DH42 at $10^5$ cfu/g corn (level A), DH42 at $10^6$ cfu/g (level B), Propionibacteria sp (Pioneer) at $10^6$ cfu/g and uninoculated sterile Reinforced Clostridial Medium broth (Unipath, England) of the same volume as level B of DH42. Prior to inoculation, all inoculants were added with sterile distilled water to bring final volume to 100 ml. Four replicates were made for each treatment combination. Samples were collected at days 0, 10, 21 and 120 for chemical and microbial analyses. Aerobic stability tests were done on day 120 samples. Samples were taken and exposed to air for 5 days. Daily temperature changes were monitored. Samples for analyses were taken on days 1, 3 and 5 after aerobic exposure.

Statistical Analyses

The data for fermentation phase was analyzed as a multi-factorial design using the general linear model of the Statistical Analysis System (SAS, 1990). Treatment means were compared using the Tukey-Kramer test (SAS, 1990). Microbial counts were analyzed using the transformed data ($\log_{10}$ (Y+1), where Y is the microbial count. For the aerobic stability phase, data were analyzed using the repeated measures analysis (SAS, 1990).

Results

Fermentation Phase: Propionic acid (Table 30) levels on day 0 were similar for all treatments. On day 10, DH42 at $10^6$ cfu and the Pioneer strain at moisture D had the highest propionic acid levels. On days 21 and 120, the DH42-inoculated silages at moisture levels B and C had relatively higher propionic acid content compared to other treatments. The average propionic acid (Table 31) content of the silages across moisture levels was highest in DH42-treated silages on day 21 (0.061 g/100 g DM), and comparable to the Pioneer strain in day 120 (0.247 g/100 g DM vs 0.213).

Acetic acid (Table 32) content of silages on days 10 and 21 of DH42-inoculated silages were comparable if not higher than the Pioneer-inoculated silages. On day 120, differences among inoculants were not significant. Lactic acid (Table 33) and glucose (Table 34) contents were highest in silages of moisture levels A and B on days 21 and 120. On the other hand, ethanol content (Table 35) was generally higher in silages from moisture level B. The control and media-treated silages gave higher ethanol values.

Effect of moisture content and microbial inoculation on pH of the silages was evident. Table 36 shows that the higher moisture content and inoculated silages have lower pH values. At day 120, the pH ranged from 3.70 to 4.67. Moisture level A had the lowest pH values.

Microbial analyses showed lowest yeast and mold (Table 37) counts of the DH42-treated silages at day 10. At day 21, the DH42 and Pioneer-inoculated silages had lower counts compared to the control. At day 120, inoculation had no effect on yeast and mold counts although values were generally lower for the DH42-inoculated silages. The silages in moisture A also had the highest counts. Table 38 shows the average yeast and mold counts of the silages. While the DH42-treated silages were comparable to the Pioneer-treated silages, numerical values were lower.

Aerobic Phase. During aerobic exposure, silages from moisture level B had higher propionic acid (Table 39) content. The DH42-treated silages from moisture level B had about 0.337 g/100 g DM after one day of aerobic exposure. The DH42-treated silages generally had higher propionic acid compared to other treatments (Table 40). The same trend was observed in the acetic acid (Table 41) content. Lactic acid (Table 42) and glucose (Table 43) and ethanol (Table 44) levels were higher in silages from moisture levels A and B. The pH (Table 45) of the higher DM silages tended to be higher. However, the control and media-inoculated silages from moisture A had increased pH levels after 3 and 5 days of aerobic exposure.

Yeast and mold counts (Tables 46 and 47) were lower for the DH42-inoculated silages after aerobic exposure although not different from the Pioneer and media-treated silages. Temperature (Table 48) increased only in the silages from moisture A.

TABLE 30

Effect of propionibacteria on the propionic acid (g/100 g DM) content of ensiled high moisture corn.

| | | Ensiling Period (d) | | | |
|---|---|---|---|---|---|
| Moisture level | Inoculant | 0 | 10 | 21 | 120 |
| A | Control | $0.000^a$ | $0.003^d$ | $0.008^e$ | $0.169^{cdefghi}$ |
| | DH42 (A) | $0.000^a$ | $0.002^d$ | $0.006^e$ | $0.174^{cdefghi}$ |
| | DH42 (B) | $0.000^a$ | $0.004^d$ | $0.010^e$ | $0.176^{cdefghi}$ |
| | Pioneer | $0.000^a$ | $0.003^d$ | $0.006^e$ | $0.178^{cdefghi}$ |
| | Media | $0.012^a$ | $0.003^d$ | $0.006^e$ | $0.175^{cdefghi}$ |
| B | Control | $0.002^a$ | $0.002^d$ | $0.015^e$ | $0.337^{ab}$ |
| | DH42 (A) | $0.000^a$ | $0.003^d$ | $0.010^e$ | $0.303^{abcde}$ |
| | DH42 (B) | $0.011^a$ | $0.006^d$ | $0.017^{de}$ | $0.317^{abc}$ |
| | Pioneer | $0.048^a$ | $0.004^d$ | $0.010^e$ | $0.286^{abcdef}$ |
| | Media | $0.057^a$ | $0.006^d$ | $0.014^e$ | $0.309^{abcde}$ |
| C | Control | $0.005^a$ | $0.006^d$ | $0.002^e$ | $0.102^h$ |
| | DH42 (A) | $0.013^a$ | $0.005^d$ | $0.059^{bc}$ | $0.263^{abcdef}$ |
| | DH42 (B) | $0.035^a$ | $0.036^{bc}$ | $0.150^a$ | $0.344^a$ |
| | Pioneer | $0.041^a$ | $0.015^{cd}$ | $0.073^b$ | $0.283^{abcdef}$ |
| | Media | $0.016^a$ | $0.006^d$ | $0.004^e$ | $0.129^{hi}$ |
| D | Control | $0.007^a$ | $0.006^d$ | $0.009^e$ | $0.092^h$ |
| | DH42 (A) | $0.042^a$ | $0.022^{bcd}$ | $0.027^{cde}$ | $0.152^{fghi}$ |
| | DH42 (B) | $0.020^a$ | $0.075^a$ | $0.141^a$ | $0.261^{abcdefg}$ |
| | Pioneer | $0.025^a$ | $0.047^d$ | $0.038^{bcde}$ | $0.171^{defghi}$ |
| | Media | $0.017^a$ | $0.003^d$ | $0.008^e$ | $0.138^{ghi}$ |
| E | Control | $0.000^a$ | $0.003^d$ | $0.002^e$ | $0.063^h$ |
| | DH42 (A) | $0.003^a$ | $0.003^d$ | $0.013^e$ | $0.139^{ghi}$ |
| | DH42 (B) | $0.018^a$ | $0.025^{bcd}$ | $0.032^{cde}$ | $0.185^{cdefgh}$ |
| | Pioneer | $0.019^a$ | $0.016^{cd}$ | $0.031^{cde}$ | $0.186^{cdefgh}$ |
| | Media | $0.030^a$ | $0.005^d$ | $0.002^e$ | $0.089^h$ |
| F | Control | $0.005^a$ | $0.000^d$ | $0.000^e$ | $0.029^h$ |
| | DH42 (A) | $0.005^a$ | $0.000^d$ | $0.005^e$ | $0.154^{efghi}$ |
| | DH42 (B) | $0.013^a$ | $0.002^d$ | $0.018^{cde}$ | $0.197^{bcdefgh}$ |
| | Pioneer | $0.006^a$ | $0.001^d$ | $0.009^e$ | $0.178^{cdefghi}$ |
| | Media | $0.024^a$ | $0.001^d$ | $0.002^e$ | $0.018^h$ |

Column means of different superscripts are significant (P < 0.01)

TABLE 31

Average propionic acid (g/100 g DM) content of ensiled high moisture corn

| | Ensiling period (d) | | | |
|---|---|---|---|---|
| Inoculant | 0 | 10 | 21 | 120 |
| Control | $0.003^a$ | $0.003^c$ | $0.006^c$ | $0.132^c$ |
| DH42 (A) | $0.011^a$ | $0.006^{bc}$ | $0.020^b$ | $0.197^b$ |
| DH42 (B) | $0.016^a$ | $0.025^a$ | $0.061^a$ | $0.247^b$ |
| Pioneer | $0.023^a$ | $0.014^b$ | $0.028^b$ | $0.213^{ab}$ |
| Media | $0.026^a$ | $0.004^c$ | $0.006^c$ | $0.143^c$ |

Column means of different superscripts are significant (P < 0.01).

TABLE 32

Effect of propionibacteria on the acetic acid (g/100 g DM) content of ensiled high moisture corn

| Moisture level | Inoculant | Ensiling period (d) | | | |
|---|---|---|---|---|---|
| | | 0 | 10 | 21 | 120 |
| A | Control | 0.000$^d$ | 0.180$^{abc}$ | 0.169$^{bcd}$ | 0.195$^a$ |
| | DH42 (A) | 0.000$^d$ | 0.193$^{abc}$ | 0.166$^{abcd}$ | 0.204$^a$ |
| | DH42 (B) | 0.000$^d$ | 0.204$^{ab}$ | 0.174$^{abcd}$ | 0.218$^a$ |
| | Pioneer | 0.005$^{cd}$ | 0.188$^{abc}$ | 0.167$^{abcd}$ | 0.198$^a$ |
| | Media | 0.013$^{cd}$ | 0.213$^a$ | 0.159$^{abcd}$ | 0.218$^a$ |
| B | Control | 0.032$^{cd}$ | 0.149$^{abcde}$ | 0.161$^{abcd}$ | 0.311$^a$ |
| | DH42 (A) | 0.041$^{abcd}$ | 0.125$^{abcde}$ | 0.167$^{abc}$ | 0.299$^a$ |
| | DH42 (B) | 0.074$^{ab}$ | 0.173$^{abc}$ | 0.177$^{abc}$ | 0.324$^a$ |
| | Pioneer | 0.069$^{ab}$ | 0.171$^{abc}$ | 0.160$^{abcd}$ | 0.292$^a$ |
| | Media | 0.076$^a$ | 0.154$^{abcd}$ | 0.185$^{abc}$ | 0.285$^a$ |
| C | Control | 0.017$^{cd}$ | 0.092$^{cdefgh}$ | 0.156$^{abcd}$ | 0.276$^a$ |
| | DH42 (A) | 0.021$^{cd}$ | 0.093$^{cdefgh}$ | 0.200$^{ab}$ | 0.414$^a$ |
| | DH42 (B) | 0.026$^{cd}$ | 0.121$^{abcde}$ | 0.253$^a$ | 0.482$^a$ |
| | Pioneer | 0.035$^{cd}$ | 0.108$^{bcdefg}$ | 0.254$^a$ | 0.476$^a$ |
| | Media | 0.027$^{cd}$ | 0.097$^{cdefgh}$ | 0.157$^{abcd}$ | 0.291$^a$ |
| D | Control | 0.017$^{cd}$ | 0.073$^{defgh}$ | 0.082$^{bcd}$ | 0.237$^a$ |
| | DH42 (A) | 0.031$^{cd}$ | 0.100$^{bcdefgh}$ | 0.109$^{abcd}$ | 0.347$^a$ |
| | DH42 (B) | 0.018$^{cd}$ | 0.146$^{abcde}$ | 0.153$^{abcd}$ | 0.463$^a$ |
| | Pioneer | 0.029$^{cd}$ | 0.088$^{cdefgh}$ | 0.146$^{abcd}$ | 0.396$^a$ |
| | Media | 0.013$^{cd}$ | 0.148$^{abcde}$ | 0.068$^{bcd}$ | 0.256$^a$ |
| E | Control | 0.003$^d$ | 0.073$^{defgh}$ | 0.139$^{abcd}$ | 0.199$^a$ |
| | DH42 (A) | 0.016$^{cd}$ | 0.121$^{abcde}$ | 0.192$^{ab}$ | 0.222$^a$ |
| | DH42 (B) | 0.037$^{bcd}$ | 0.143$^{abcde}$ | 0.243$^a$ | 0.325$^a$ |
| | Pioneer | 0.046$^{abc}$ | 0.166$^{abcd}$ | 0.135$^{abcd}$ | 0.290$^a$ |
| | Media | 0.029$^{cd}$ | 0.116$^{abcde}$ | 0.006$^d$ | 0.185$^a$ |
| F | Control | 0.026$^{cd}$ | 0.003$^h$ | 0.014$^{cd}$ | 0.114$^a$ |
| | DH42 (A) | 0.034$^{bcd}$ | 0.003$^h$ | 0.032$^{bcd}$ | 0.166$^a$ |
| | DH42 (B) | 0.021$^{cd}$ | 0.008$^{gh}$ | 0.062$^{bcd}$ | 0.139$^a$ |
| | Pioneer | 0.025$^{cd}$ | 0.015$^{fgh}$ | 0.090$^{abcd}$ | 0.160$^a$ |
| | Media | 0.033$^{bcd}$ | 0.047$^{efgh}$ | 0.082$^{abcd}$ | 0.118$^a$ |

Column means of different superscripts are significant (P < 0.01).

TABLE 33

Effect of propionibacteria on the lactic acid (g/100 g DM) content of ensiled high moisture corn

| Moisture level | Inoculant | Ensiling Period (d) | | | |
|---|---|---|---|---|---|
| | | 0 | 10 | 21 | 120 |
| A | Control | 0.000$^a$ | 2.024$^{ab}$ | 2.277$^a$ | 3.605$^a$ |
| | DH42 (A) | 0.000$^a$ | 2.078$^{ab}$ | 2.194$^a$ | 3.561$^a$ |
| | DH42 (B) | 0.000$^a$ | 2.189$^a$ | 2.220$^a$ | 3.488$^a$ |
| | Pioneer | 0.000$^a$ | 1.991$^{ab}$ | 2.185$^a$ | 3.686$^a$ |
| | Media | 0.010$^a$ | 2.402$^a$ | 2.118$^a$ | 3.617$^a$ |
| B | Control | 0.068$^a$ | 1.476$^c$ | 2.067$^a$ | 2.315$^b$ |
| | DH42 (A) | 0.094$^a$ | 1.606$^{bc}$ | 2.076$^a$ | 2.131$^{bc}$ |
| | DH42 (B) | 0.100$^a$ | 1.638$^{bc}$ | 2.165$^a$ | 2.530$^b$ |
| | Pioneer | 0.080$^a$ | 1.415$^d$ | 1.954$^a$ | 2.316$^b$ |
| | Media | 0.101$^a$ | 1.604$^{bc}$ | 2.186$^a$ | 2.530$^b$ |
| C | Control | 0.079$^a$ | 0.670$^{de}$ | 1.065$^b$ | 1.245$^{de}$ |
| | DH42 (A) | 0.085$^a$ | 0.575$^{def}$ | 0.833$^{bcd}$ | 1.120$^{def}$ |
| | DH42 (B) | 0.092$^a$ | 0.488$^{defg}$ | 0.778$^{bcde}$ | 1.042$^{defg}$ |
| | Pioneer | 0.111$^a$ | 0.556$^{defg}$ | 0.836$^{bcd}$ | 1.313$^{cd}$ |
| | Media | 0.081$^a$ | 0.634$^{de}$ | 0.942$^{bc}$ | 1.114$^{def}$ |
| D | Control | 0.013$^a$ | 0.710$^d$ | 0.718$^{bcde}$ | 0.626$^{ddefg}$ |
| | DH42 (A) | 0.020$^a$ | 0.635$^{de}$ | 0.588$^{cdef}$ | 0.586$^{defg}$ |
| | DH42 (B) | 0.005$^a$ | 0.584$^{def}$ | 0.454$^{def}$ | 0.484$^{efg}$ |
| | Pioneer | 0.010$^a$ | 0.849$^d$ | 0.787$^{bcde}$ | 0.888$^{defg}$ |
| | Media | 0.002$^a$ | 0.640$^{de}$ | 0.778$^{bcde}$ | 0.882$^{defg}$ |
| E | Control | 0.002$^a$ | 0.603$^{de}$ | 0.266$^f$ | 0.918$^{defg}$ |
| | DH42 (A) | 0.013$^a$ | 0.489$^{defg}$ | 0.267$^f$ | 0.651$^{defg}$ |
| | DH42 (B) | 0.091$^a$ | 0.539$^{defg}$ | 0.190$^f$ | 0.564$^{defg}$ |
| | Pioneer | 0.067$^a$ | 0.401$^{defg}$ | 0.157$^f$ | 0.412$^{fg}$ |
| | Media | 0.084$^a$ | 0.577$^{def}$ | 0.147$^f$ | 0.881$^{defg}$ |
| F | Control | 0.054$^a$ | 0.036$^g$ | 0.150$^f$ | 0.459$^{efg}$ |
| | DH42 (A) | 0.046$^a$ | 0.038$^g$ | 0.159$^f$ | 0.307$^{fg}$ |
| | DH42 (B) | 0.051$^a$ | 0.042$^g$ | 0.191$^f$ | 0.180$^g$ |
| | Pioneer | 0.020$^a$ | 0.073$^{fg}$ | 0.320$^{ef}$ | 0.294$^{fg}$ |
| | Media | 0.035$^a$ | 0.166$^{efg}$ | 0.456$^{def}$ | 0.544$^{defg}$ |

Column means of different superscripts are significant (P < 0.01).

TABLE 34

Effect of propionibacteria on the glucose (g/100 g DM) content of ensiled high moisture corn

| Moisture level | Inoculant | Ensiling period (d) | | | |
|---|---|---|---|---|---|
| | | 0 | 10 | 21 | 120 |
| A | Control | 0.999$^a$ | 0.148$^{abc}$ | 0.140$^{cde}$ | 0.260$^{abcd}$ |
| | DH42 (A) | 0.920$^a$ | 0.177$^a$ | 0.151$^{cd}$ | 0.207$^{bcdefg}$ |
| | DH42 (B) | 1.015$^a$ | 0.189$^a$ | 0.146$^{cde}$ | 0.214$^{bcdef}$ |
| | Pioneer | 1.011$^a$ | 0.135$^{abcd}$ | 0.150$^{cd}$ | 0.261$^{abcd}$ |
| | Media | 0.747$^b$ | 0.182$^a$ | 0.169$^{bc}$ | 0.285$^{abc}$ |
| B | Control | 0.104$^{de}$ | 0.167$^{ab}$ | 0.231$^{ab}$ | 0.409$^a$ |
| | DH42 (A) | 0.098$^e$ | 0.177$^a$ | 0.240$^a$ | 0.362$^{ab}$ |
| | DH42 (B) | 0.113$^{de}$ | 0.182$^a$ | 0.238$^a$ | 0.397$^a$ |
| | Pioneer | 0.090$^e$ | 0.161$^{ab}$ | 0.229$^{ab}$ | 0.355$^{ab}$ |
| | Media | 0.092$^e$ | 0.181$^a$ | 0.276$^a$ | 0.394$^a$ |
| C | Control | 0.080$^e$ | 0.098$^{bcdef}$ | 0.110$^{cdefg}$ | 0.191$^{cde}$ |
| | DH42 (A) | 0.101$^e$ | 0.082$^{cdef}$ | 0.091$^{defgh}$ | 0.197$^{cde}$ |
| | DH42 (B) | 0.055$^e$ | 0.079$^{cdef}$ | 0.088$^{defghi}$ | 0.168$^{cdef}$ |
| | Pioneer | 0.058$^e$ | 0.067$^{def}$ | 0.085$^{defghi}$ | 0.163$^{cdef}$ |
| | Media | 0.063$^e$ | 0.076$^{cdef}$ | 0.094$^{defgh}$ | 0.175$^{cdef}$ |
| D | Control | 0.060$^e$ | 0.033$^{ef}$ | 0.081$^{efghi}$ | 0.054$^{efgh}$ |
| | DH42 (A) | 0.055$^e$ | 0.040$^{ef}$ | 0.057$^{fghi}$ | 0.050$^{gh}$ |
| | DH42 (B) | 0.050$^e$ | 0.047$^{ef}$ | 0.117$^{cdef}$ | 0.101$^{defgh}$ |
| | Pioneer | 0.048$^e$ | 0.044$^{ef}$ | 0.043$^{hi}$ | 0.029$^h$ |
| | Media | 0.049$^e$ | 0.045$^{ef}$ | 0.067$^{fghi}$ | 0.087$^{defgh}$ |
| E | Control | 0.271$^c$ | 0.046$^{ef}$ | 0.036$^{hi}$ | 0.087$^{defgh}$ |
| | DH42 (A) | 0.248$^{cd}$ | 0.045$^{ef}$ | 0.039$^{hi}$ | 0.081$^{efgh}$ |
| | DH42 (B) | 0.133$^{cde}$ | 0.042$^{ef}$ | 0.034$^{hi}$ | 0.060$^{fgh}$ |
| | Pioneer | 0.115$^{de}$ | 0.043$^{ef}$ | 0.029$^i$ | 0.103$^{defgh}$ |
| | Media | 0.080$^e$ | 0.041$^{ef}$ | 0.028$^i$ | 0.055$^{fgh}$ |
| F | Control | 0.047$^e$ | 0.159$^{ab}$ | 0.116$^{cdefg}$ | 0.058$^{efgh}$ |
| | DH42 (A) | 0.043$^e$ | 0.167$^{ab}$ | 0.084$^{defghi}$ | 0.107$^{defgh}$ |
| | DH42 (B) | 0.023$^e$ | 0.132$^{abcd}$ | 0.059$^{fghi}$ | 0.086$^{efgh}$ |
| | Pioneer | 0.039$^e$ | 0.096$^{bcde}$ | 0.046$^{ghi}$ | 0.111$^{defgh}$ |
| | Media | 0.045$^e$ | 0.032$^f$ | 0.049$^{ghi}$ | 0.054$^{efgh}$ |

Column means of different superscripts are significant (P < 0.01).

TABLE 35

Effect of propionibacteria on the ethanol (g/100 g DM) content of ensiled high moisture corn

| Moisture level | Inoculant | Ensiling period (d) | | | |
|---|---|---|---|---|---|
| | | 0 | 10 | 21 | 120 |
| A | Control | 0.000$^f$ | 0.611$^{abcdef}$ | 0.559$^{bcd}$ | 0.478$^{cdefg}$ |
| | DH42 (A) | 0.000$^f$ | 0.676$^{abc}$ | 0.551$^{cd}$ | 0.563$^{abcdefg}$ |
| | DH42 (B) | 0.000$^f$ | 0.627$^{abcd}$ | 0.544$^{cd}$ | 0.516$^{bcdefg}$ |
| | Pioneer | 0.000$^f$ | 0.591$^{abcdefg}$ | 0.547$^{cd}$ | 0.488$^{cdefg}$ |
| | Media | 0.008$^{ef}$ | 0.751$^a$ | 0.538$^d$ | 0.505$^{bcdefg}$ |
| B | Control | 0.125$^{bc}$ | 0.693$^{ab}$ | 0.842$^{ab}$ | 0.850$^{abc}$ |
| | DH42 (A) | 0.181$^{ab}$ | 0.691$^{ab}$ | 0.848$^a$ | 0.877$^{abc}$ |
| | DH42 (B) | 0.200$^a$ | 0.681$^{abc}$ | 0.827$^{abc}$ | 0.917$^{ab}$ |
| | Pioneer | 0.161$^{ab}$ | 0.632$^{abcd}$ | 0.826$^{abc}$ | 0.861$^{abc}$ |
| | Media | 0.165$^{ab}$ | 0.686$^{abc}$ | 0.819$^{abcd}$ | 0.858$^{abc}$ |
| C | Control | 0.025$^{ef}$ | 0.604$^{abcdef}$ | 0.663$^{abcd}$ | 0.753$^{abcd}$ |
| | DH42 (A) | 0.053$^{ef}$ | 0.527$^{abcdefgh}$ | 0.550$^d$ | 0.543$^{bcdef}$ |
| | DH42 (B) | 0.067$^{cde}$ | 0.550$^{abcdefgh}$ | 0.540$^d$ | 0.490$^{defg}$ |

TABLE 35-continued

Effect of propionibacteria on the ethanol (g/100 g DM) content of ensiled high moisture corn

| Moisture level | Inoculant | Ensiling period (d) | | | |
|---|---|---|---|---|---|
| | | 0 | 10 | 21 | 120 |
| D | Pioneer | 0.065$^{def}$ | 0.528$^{abcdefgh}$ | 0.494$^d$ | 0.527$^{bcdef}$ |
| | Media | 0.073$^{cd}$ | 0.520$^{abcdefghi}$ | 0.501$^d$ | 0.673$^{abcde}$ |
| | Control | 0.039$^{ef}$ | 0.545$^{abcdefghi}$ | 0.588$^{ab}$ | 0.415$^{defg}$ |
| | DH42 (A) | 0.029$^{ef}$ | 0.454$^{bcdefghi}$ | 0.522$^d$ | 0.411$^{defg}$ |
| | DH42 (B) | 0.040$^{ef}$ | 0.465$^{bcdefghi}$ | 0.587$^{ab}$ | 0.481$^{cdefg}$ |
| | Pioneer | 0.030$^{ef}$ | 0.396$^{defghi}$ | 0.415$^{de}$ | 0.324$^{fg}$ |
| | Media | 0.034$^{ef}$ | 0.497$^{abcdefghi}$ | 0.627$^{ab}$ | 0.547$^{abcdefg}$ |
| | Control | 0.000$^f$ | 0.444$^{cdefghi}$ | 0.154$^f$ | 0.153$^g$ |
| | DH42 (A) | 0.013$^{ef}$ | 0.397$^{defghi}$ | 0.227$^{ef}$ | 0.258$^{fg}$ |
| E | DH42 (B) | 0.028$^{ef}$ | 0.407$^{defghi}$ | 0.215$^{ef}$ | 0.343$^{efg}$ |
| | Pioneer | 0.044$^{ef}$ | 0.368$^{efghi}$ | 0.139$^f$ | 0.260$^{fg}$ |
| | Media | 0.045$^{ef}$ | 0.361$^{fghi}$ | 0.002$^f$ | 0.423$^{defg}$ |
| | Control | 0.060$^{cde}$ | 0.260$^i$ | 0.628$^{ab}$ | 0.556$^{abcdefg}$ |
| | DH42 (A) | 0.047$^{ef}$ | 0.317$^{ghi}$ | 0.574$^{ab}$ | 0.439$^{cdefg}$ |
| F | DH42 (B) | 0.040$^{ef}$ | 0.306$^{hi}$ | 0.546$^{cd}$ | 0.369$^{efg}$ |
| | Pioneer | 0.034$^{ef}$ | 0.289$^{hi}$ | 0.594$^{ab}$ | 0.357$^{efg}$ |
| | Media | 0.040$^{ef}$ | 0.349$^{efghi}$ | 0.598$^{ab}$ | 0.588$^{abcdef}$ |

Column means of different superscripts are significant (P < 0.01).

TABLE 36

Effect of propionibacteria on the pH of ensiled high moisture corn

| Moisture level | Inoculant | Ensiling period (d) | | | |
|---|---|---|---|---|---|
| | | 0 | 10 | 21 | 120 |
| A | Control | 5.78$^a$ | 3.89$^e$ | 3.79$^d$ | 3.70$^h$ |
| | DH42 (A) | 5.69$^{abcd}$ | 3.90$^e$ | 3.80$^d$ | 3.73$^h$ |
| | DH42 (B) | 5.70$^{abc}$ | 3.89$^e$ | 3.79$^d$ | 3.74$^h$ |
| | Pioneer | 5.71$^{ab}$ | 3.92$^e$ | 3.79$^d$ | 3.72$^h$ |
| | Media | 5.71$^{abc}$ | 3.90$^e$ | 3.80$^d$ | 3.75$^h$ |
| B | Control | 5.56$^{abcdefg}$ | 4.04$^e$ | 3.90$^d$ | 4.12$^{fg}$ |
| | DH42 (A) | 5.63$^{abcde}$ | 4.06$^e$ | 3.89$^d$ | 4.10$^{fg}$ |
| | DH42 (B) | 5.59$^{abcdefg}$ | 4.01$^e$ | 3.90$^d$ | 4.04$^g$ |
| | Pioneer | 5.57$^{abcdefg}$ | 4.08$^e$ | 3.92$^d$ | 4.02$^g$ |
| | Media | 5.64$^{abcde}$ | 4.03$^e$ | 3.89$^d$ | 4.05$^g$ |
| C | Control | 5.52$^{abcdefg}$ | 4.72$^{bc}$ | 4.51$^b$ | 4.24$^{def}$ |
| | DH42 (A) | 5.48$^{abcdefg}$ | 4.62$^{bcd}$ | 4.50$^{bc}$ | 4.18$^{defg}$ |
| | DH42 (B) | 5.52$^{abcdefg}$ | 4.86$^{bcd}$ | 4.48$^{bc}$ | 4.14$^{fg}$ |
| | Pioneer | 5.53$^{abcdefg}$ | 4.62$^{bcd}$ | 4.55$^b$ | 4.16$^{efgh}$ |
| | Media | 5.49$^{abcdefg}$ | 4.61$^{bcd}$ | 4.46$^b$ | 4.22$^{def}$ |
| D | Control | 5.35$^{bcdefghi}$ | 4.55$^{bcd}$ | 4.46$^{bc}$ | 4.43$^{bc}$ |
| | DH42 (A) | 5.48$^{abcdefg}$ | 4.53$^{cd}$ | 4.46$^{bc}$ | 4.40$^{bc}$ |
| | DH42 (B) | 5.46$^{abcdefg}$ | 4.60$^{bcd}$ | 4.46$^{bc}$ | 4.33$^{cd}$ |
| | Pioneer | 5.36$^{abcdefghi}$ | 4.36$^d$ | 4.27$^c$ | 4.27$^{cdef}$ |
| | Media | 5.41$^{abcdefghi}$ | 4.70$^{bcd}$ | 4.56$^b$ | 4.40$^{bc}$ |
| E | Control | 5.32$^{defghi}$ | 4.79$^{bc}$ | 4.55$^b$ | 4.27$^{cdef}$ |
| | DH42 (A) | 5.22$^i$ | 4.84$^{bc}$ | 4.54$^b$ | 4.33$^{cd}$ |
| | DH42 (B) | 5.26$^{fghi}$ | 4.76$^{bc}$ | 4.53$^b$ | 4.30$^{cde}$ |
| | Pioneer | 5.23$^{hi}$ | 4.88$^b$ | 4.62$^b$ | 4.34$^{cd}$ |
| | Media | 5.24$^{hi}$ | 4.80$^{bc}$ | 4.51$^b$ | 4.31$^{cde}$ |
| F | Control | 5.26$^{efghi}$ | 5.30$^a$ | 5.18$^a$ | 4.67$^a$ |
| | DH42 (A) | 5.27$^{efghi}$ | 5.29$^a$ | 5.06$^a$ | 4.57$^{ab}$ |
| | DH42 (B) | 5.22$^{ghi}$ | 5.29$^a$ | 4.97$^a$ | 4.56$^{ab}$ |
| | Pioneer | 5.24$^{ghi}$ | 5.29$^a$ | 5.04$^a$ | 4.55$^{ab}$ |
| | Media | 5.30$^{cdefghi}$ | 5.28$^a$ | 5.16$^a$ | 4.67$^a$ |

Column means of different superscripts are significant (P < 0.01).

TABLE 37

Effect of propionibacteria on the yeast and molds (log cfu/g DM) of ensiled high moisture corn

| Moisture level | Inoculant | Ensiling period (d) | | | |
|---|---|---|---|---|---|
| | | 0 | 10 | 21 | 120 |
| A | Control | 4.87$^{abcd}$ | 4.56$^{ab}$ | 4.52$^{abc}$ | 3.20$^a$ |
| | DH42 (A) | 5.17$^{abcd}$ | 4.84$^{ab}$ | 4.51$^{abc}$ | 2.11$^a$ |
| | DH42 (B) | 5.23$^{abcd}$ | 5.17$^{ab}$ | 4.40$^{abc}$ | 2.02$^a$ |
| | Pioneer | 5.31$^{abcd}$ | 4.72$^{ab}$ | 5.05$^{abc}$ | 2.98$^a$ |
| | Media | 4.60$^{bcd}$ | 4.25$^{abc}$ | 4.99$^{abc}$ | 3.13$^a$ |
| B | Control | 5.44$^{abcd}$ | 4.64$^{ab}$ | 4.13$^{abc}$ | 0.18$^a$ |
| | DH42 (A) | 5.31$^{abcd}$ | 4.58$^{ab}$ | 4.37$^{abc}$ | 0.25$^a$ |
| | DH42 (B) | 5.36$^{abcd}$ | 4.23$^{ab}$ | 3.82$^{abc}$ | 0.13$^a$ |
| | Pioneer | 5.35$^{abcd}$ | 4.71$^{ab}$ | 4.35$^{abc}$ | 0.00$^a$ |
| | Media | 5.44$^{abcd}$ | 5.05$^{ab}$ | 4.33$^{abc}$ | 0.00$^a$ |
| C | Control | 4.94$^{abcd}$ | 5.03$^{ab}$ | 5.59$^{ab}$ | 2.22$^a$ |
| | DH42 (A) | 4.79$^{bcd}$ | 4.45$^{ab}$ | 4.92$^{abc}$ | 1.65$^a$ |
| | DH42 (B) | 4.89$^{bcd}$ | 4.81$^{ab}$ | 3.70$^{abc}$ | 0.91$^a$ |
| | Pioneer | 4.72$^{bcd}$ | 4.45$^{ab}$ | 2.93$^c$ | 1.05$^a$ |
| | Media | 4.80$^{bcd}$ | 4.51$^{ab}$ | 5.49$^{ab}$ | 1.73$^a$ |
| D | Control | 4.71$^{bcd}$ | 1.89$^{cd}$ | 5.02$^{abc}$ | 1.21$^a$ |
| | DH42 (A) | 4.66$^{bcd}$ | 3.80$^{bc}$ | 4.21$^{abc}$ | 1.39$^a$ |
| | DH42 (B) | 4.67$^{bcd}$ | 0.00$^d$ | 3.26$^{bc}$ | 0.19$^a$ |
| | Pioneer | 5.04$^{abcd}$ | 1.82$^{cd}$ | 4.06$^{abc}$ | 0.56$^a$ |
| | Media | 4.58$^{cd}$ | 3.92$^{abc}$ | 4.97$^{abc}$ | 0.26$^a$ |
| E | Control | 4.54$^{cd}$ | 4.95$^{ab}$ | 5.62$^{ab}$ | 2.46$^a$ |
| | DH42 (A) | 4.76$^{bcd}$ | 5.05$^{ab}$ | 5.34$^{abc}$ | 1.73$^a$ |
| | DH42 (B) | 4.48$^{cd}$ | 4.24$^{abc}$ | 4.48$^{abc}$ | 0.53$^a$ |
| | Pioneer | 4.38$^d$ | 4.94$^{ab}$ | 4.72$^{abc}$ | 0.85$^a$ |
| | Media | 4.62$^{bcd}$ | 5.27$^{ab}$ | 6.22$^a$ | 1.45$^a$ |
| F | Control | 5.78$^{ab}$ | 5.98$^{ab}$ | 5.89$^{ab}$ | 2.91$^a$ |
| | DH42 (A) | 5.63$^{abc}$ | 6.32$^a$ | 5.79$^{ab}$ | 1.19$^a$ |
| | DH42 (B) | 5.64$^{abc}$ | 6.32$^a$ | 5.48$^{ac}$ | 0.00$^a$ |
| | Pioneer | 5.97$^a$ | 6.18$^{ab}$ | 5.44$^{abc}$ | 0.94$^a$ |
| | Media | 5.59$^{abc}$ | 6.34$^a$ | 5.73$^{ab}$ | 1.72$^a$ |

Column means of different superscripts are significant P < 0.01).

TABLE 38

Average yeast and mold (log cfu/g DM) counts of ensiled high moisture corn.

| Inoculant | Ensiling Period (d) | | | |
|---|---|---|---|---|
| | 0 | 10 | 21 | 120 |
| Control | 5.05$^a$ | 4.51$^{ab}$ | 5.13$^{bc}$ | 2.03$^b$ |
| DH42 (A) | 5.05$^a$ | 4.84$^{ab}$ | 4.86$^{abc}$ | 1.37$^{ab}$ |
| DH42 (B) | 5.05$^a$ | 4.13$^a$ | 4.19$^a$ | 0.51$^a$ |
| Pioneer | 5.13$^a$ | 4.47$^{ab}$ | 4.43$^{ab}$ | 1.02$^{ab}$ |
| Media | 4.94$^a$ | 4.89$^b$ | 5.29$^a$ | 1.36$^{ab}$ |

Column means of different superscripts are significant (P < 0.01).

TABLE 39

Effect of propionibacteria on the propionic acid (g/100 g DM) content of ensiled high moisture corn during aerobic exposure.

| Moisture level | Inoculant | Aerobic exposure (d) | | | |
|---|---|---|---|---|---|
| | | 0 | 1 | 3 | 5 |
| A | Control | 0.169$^{cdefghi}$ | 0.187$^{abcdef}$ | 0.172$^{abcde}$ | 0.106$^{defg}$ |
| | DH42 (A) | 0.174$^{cdefghi}$ | 0.187$^{abcdef}$ | 0.165$^{abcde}$ | 0.128$^{cdefg}$ |
| | DH42 (B) | 0.176$^{cdefghi}$ | 0.175$^{abcdef}$ | 0.159$^{abcde}$ | 0.139$^{bcdefg}$ |
| | Pioneer | 0.178$^{cedfghi}$ | 0.176$^{abcdef}$ | 0.157$^{abcde}$ | 0.140$^{bcdefg}$ |
| | Media | 0.175$^{cdefghi}$ | 0.171$^{bcdef}$ | 0.151$^{abcde}$ | 0.089$^{efg}$ |
| B | Control | 0.337$^{ab}$ | 0.320$^{ab}$ | 0.320$^a$ | 0.254$^{ab}$ |
| | DH42 (A) | 0.303$^{abcde}$ | 0.327$^{ab}$ | 0.308$^a$ | 0.255$^{ab}$ |
| | DH42 (B) | 0.318$^{abc}$ | 0.337$^a$ | 0.321$^a$ | 0.255$^{ab}$ |
| | Pioneer | 0.286$^{abcdef}$ | 0.301$^{abc}$ | 0.304$^{abc}$ | 0.243$^{abc}$ |

TABLE 39-continued

Effect of propionibacteria on the propionic acid (g/100 g DM) content of ensiled high moisture corn during aerobic exposure.

| Moisture level | Inoculant | Aerobic exposure (d) | | | |
|---|---|---|---|---|---|
| | | 0 | 1 | 3 | 5 |
| | Media | 0.309[abcde] | 0.319[ab] | 0.309[a] | 0.270[a] |
| | Control | 0.102[h] | 0.111[def] | 0.107[de] | 0.100[ef] |
| | DH42 (A) | 0.263[abcdef] | 0.229[abcd] | 0.242[abcd] | 0.199[abcde] |
| C | DH42 (B) | 0.344[a] | 0.302[ab] | 0.281[abc] | 0.248[ab] |
| | Pioneer | 0.283[abcdef] | 0.232[abcd] | 0.241[abcd] | 0.209[abcd] |
| | Media | 0.129[hi] | 0.117[def] | 0.118[de] | 0.107[efg] |
| | Control | 0.092[h] | 0.080[ef] | 0.103[cde] | 0.092[efg] |
| | DH42 (A) | 0.152[fghi] | 0.155[cdef] | 0.166[abcde] | 0.140[cdefg] |
| D | DH42 (B) | 0.261[abcdefg] | 0.238[abcd] | 0.253[abcd] | 0.202[abcde] |
| | Pioneer | 0.171[defghi] | 0.149[def] | 0.170[abcde] | 0.138[cdef] |
| | Media | 0.138[ghi] | 0.111[def] | 0.109[cde] | 0.079[fg] |
| | Control | 0.063[h] | 0.052[ef] | 0.057[e] | 0.052[g] |
| | DH42 (A) | 0.139[ghi] | 0.144[def] | 0.138[bcde] | 0.129[cdefg] |
| E | DH42 (B) | 0.185[cdefgh] | 0.179[abcdef] | 0.167[abcde] | 0.180[abcdef] |
| | Pioneer | 0.186[cdefgh] | 0.167[cdef] | 0.200[abcde] | 0.149[bcdef] |
| | Media | 0.089[h] | 0.085[ef] | 0.065[e] | 0.108[defg] |
| | Control | 0.029[h] | 0.022[f] | 0.027[e] | 0.024[g] |
| | DH42 (A) | 0.154[efghi] | 0.145[cdef] | 0.157[abcde] | 0.106[defg] |
| F | DH42 (B) | 0.197[bcdefgh] | 0.205[abcde] | 0.186[abcde] | 0.153[abcdefg] |
| | Pioneer | 0.178[cdefghi] | 0.172[bcdef] | 0.184[abcde] | 0.140[bcdefg] |
| | Media | 0.018[i] | 0.022[f] | 0.025[e] | 0.014[h] |

Column means of different superscripts are significant (P < 0.01).

TABLE 40

Average propionic acid (g/100 g DM) content of ensiled high moisture corn during aerobic exposure.

| Inoculant | Aerobic Exposure (d) | | | |
|---|---|---|---|---|
| | 0 | 1 | 3 | 5 |
| Control | 0.132[c] | 0.129[b] | 0.131[b] | 0.105[b] |
| DH42 (A) | 0.197[b] | 0.198[a] | 0.196[a] | 0.159[a] |
| DH42 (B) | 0.247[a] | 0.239[a] | 0.228[a] | 0.196[a] |
| Pioneer | 0.213[ab] | 0.199[a] | 0.209[a] | 0.170[a] |
| Media | 0.143[c] | 0.138[b] | 0.130[b] | 0.111[b] |

Column means of different superscripts are significant (P < 0.01)

TABLE 41

Effect of propionibacteria on the acetic acid (g/100 g DM) content of ensiled high moisture corn during aerobic exposure

| Moisture level | Inoculant | Aerobic exposure (d) | | | |
|---|---|---|---|---|---|
| | | 0 | 1 | 3 | 5 |
| | Control | 0.195[a] | 0.216[bcdeghi] | 0.140[bcd] | 0.000[g] |
| | DH42 (A) | 0.204[a] | 0.224[bcdeghi] | 0.199[abcd] | 0.047[fg] |
| A | DH42 (B) | 0.218[a] | 0.208[bcdeghi] | 0.208[abcd] | 0.034[fg] |
| | Pioneer | 0.198[a] | 0.205[bcdeghi] | 0.178[abcd] | 0.043[fg] |
| | Media | 0.218[a] | 0.156[deghi] | 0.162[abcd] | 0.030[fg] |
| | Control | 0.311[a] | 0.291[abcdeghi] | 0.305[abcd] | 0.245[abcde] |
| | DH42 (A) | 0.299[a] | 0.336[abc] | 0.321[abcd] | 0.272[abcd] |
| B | DH42 (B) | 0.324[a] | 0.349[ab] | 0.345[abcd] | 0.275[abcd] |
| | Pioneer | 0.292[a] | 0.295[abcdef] | 0.306[abcd] | 0.239[abcde] |
| | Media | 0.285[a] | 0.307[abcd] | 0.297[abcd] | 0.259[abcd] |
| | Control | 0.276[a] | 0.134[i] | 0.177[cd] | 0.108[efg] |
| | DH42 (A) | 0.414[a] | 0.249[bcdeghi] | 0.329[abcd] | 0.213[bcde] |
| C | DH42 (B) | 0.482[a] | 0.259[bcdeghi] | 0.315[abcd] | 0.222[abcde] |
| | Pioneer | 0.476[a] | 0.270[abcde] | 0.392[ab] | 0.224[abcde] |
| | Media | 0.291[a] | 0.158[hi] | 0.307[abcd] | 0.089[fg] |
| | Control | 0.237[a] | 0.229[bcdeghi] | 0.269[abcd] | 0.236[abcde] |
| | DH42 (A) | 0.347[a] | 0.339[ab] | 0.353[abcd] | 0.291[abcd] |
| D | DH42 (B) | 0.463[a] | 0.392[a] | 0.435[a] | 0.359[a] |

TABLE 41-continued

Effect of propionibacteria on the acetic acid (g/100 g DM) content of ensiled high moisture corn during aerobic exposure

| Moisture level | Inoculant | Aerobic exposure (d) | | | |
|---|---|---|---|---|---|
| | | 0 | 1 | 3 | 5 |
| | Pioneer | 0.396[a] | 0.349[ab] | 0.400[abc] | 0.329[ab] |
| | Media | 0.256[a] | 0.208[bcdeghi] | 0.210[abcd] | 0.160[cdefg] |
| | Control | 0.199[a] | 0.158[deghi] | 0.168[abcd] | 0.149[cdefg] |
| | DH42 (A) | 0.222[a] | 0.205[bcdeghi] | 0.202[abcd] | 0.196[bcdef] |
| E | DH42 (B) | 0.325[a] | 0.299[abcd] | 0.298[abcd] | 0.284[abcd] |
| | Pioneer | 0.290[a] | 0.244[abcdeghi] | 0.268[abcd] | 0.232[abcde] |
| | Media | 0.185[a] | 0.161[deghi] | 0.123[d] | 0.179[bcdef] |
| | Control | 0.114[a] | 0.107[h] | 0.099[d] | 0.071[ef] |
| | DH42 (A) | 0.166[a] | 0.153[deghi] | 0.162[abcd] | 0.118[defg] |
| F | DH42 (B) | 0.139[a] | 0.170[cdeghi] | 0.145[abcd] | 0.121[cdefg] |
| | Pioneer | 0.160[a] | 0.195[bcdeghi] | 0.175[abcd] | 0.131[cdefg] |
| | Media | 0.118[a] | 0.149[deghi] | 0.115[cd] | 0.073[ef] |

Column means of different superscripts are significant (P < 0.01)

TABLE 42

Effect of propionibacteria on the lactic acid (g/100 g DM) content of ensiled high moisture corn during aerobic exposure

| Moisture level | Inoculant | Aerobic exposure (d) | | | |
|---|---|---|---|---|---|
| | | 0 | 1 | 3 | 5 |
| | Control | 3.605[a] | 3.793[a] | 3.511[a] | 1.144[abcdef] |
| | DH42 (A) | 3.561[a] | 3.684[a] | 3.451[ab] | 1.569[abcdef] |
| A | DH42 (B) | 3.488[a] | 3.376[ab] | 3.387[ab] | 2.322[a] |
| | Pioneer | 3.686[a] | 3.630[a] | 3.381[ab] | 1.787[abcdef] |
| | Media | 3.617[a] | 3.249[abc] | 2.294[ab] | 1.064[abcdef] |
| | Control | 2.315[b] | 2.156[d] | 2.144[c] | 1.730[abcdef] |
| | DH42 (A) | 2.131[bc] | 2.207[d] | 2.043[cd] | 1.714[abcdef] |
| B | DH42 (B) | 2.530[b] | 2.530[bcd] | 2.383[abc] | 1.931[abcd] |
| | Pioneer | 2.316[b] | 2.348[d] | 2.357[abc] | 1.918[abcde] |
| | Media | 2.530[b] | 2.436[cd] | 2.339[bc] | 2.079[ab] |
| | Control | 1.245[de] | 1.280[e] | 1.140[de] | 0.935[abcdef] |
| | DH42 (A) | 1.120[def] | 1.122[efgh] | 1.147[de] | 0.917[abcdef] |
| C | DH42 (B) | 1.042[defg] | 1.079[efghi] | 1.100[e] | 0.871[abcdef] |
| | Pioneer | 1.313[cd] | 1.182[efg] | 1.118[de] | 0.893[abcdef] |
| | Media | 1.114[def] | 1.238[ef] | 0.882[e] | 0.957[abcdef] |
| | Control | 0.626[defg] | 0.559[fghi] | 0.680[e] | 0.604[bcdef] |
| | DH42 (A) | 0.586[defg] | 0.576[efghi] | 0.604[e] | 0.481[def] |
| D | DH42 (B) | 0.484[efg] | 0.484[ghi] | 0.519[e] | 0.408[ef] |
| | Pioneer | 0.888[defg] | 0.802[efghi] | 0.880[e] | 0.750[abcdef] |
| | Media | 0.882[defg] | 0.701[efghi] | 0.731[e] | 0.552[cdef] |
| | Control | 0.918[defg] | 0.734[efghi] | 0.794[e] | 0.757[abcdef] |
| | DH42 (A) | 0.651[defg] | 0.642[efghi] | 0.608[e] | 0.625[bcdef] |
| E | DH42 (B) | 0.564[defg] | 0.529[fghi] | 0.457[e] | 0.568[bcdef] |
| | Pioneer | 0.412[fg] | 0.383[i] | 0.509[e] | 0.471[def] |
| | Media | 0.881[defg] | 0.823[efghi] | 0.614[e] | 0.764[abcdef] |
| | Control | 0.459[efg] | 0.459[fghi] | 0.441[e] | 0.438[def] |
| | DH42 (A) | 0.307[fg] | 0.345[h] | 0.356[e] | 0.271[f] |
| F | DH42 (B) | 0.180[g] | 0.434[ghi] | 0.195[e] | 0.154[f] |
| | Pioneer | 0.294[fg] | 0.596[efghi] | 0.317[e] | 0.253[f] |
| | Media | 0.544[defg] | 0.613[efghi] | 0.538[e] | 0.339[def] |

Column means of different superscripts are significant (P < 0.01)

TABLE 43

Effect of propionibacteria on the glucose (g/100 g DM) content of ensiled high moisture corn during aerobic exposure

| Moisture level | Inoculant | Aerobic exposure (d) | | | |
|---|---|---|---|---|---|
| | | 0 | 1 | 3 | 5 |
| | Control | 0.260[abcd] | 0.272[abcd] | 0.255[abcd] | 0.150[bcd] |
| | DH42 (A) | 0.207[bcdefg] | 0.215[bcdefg] | 0.207[cdefg] | 0.181[abcd] |
| A | DH42 (B) | 0.214[bcdefg] | 0.207[cdefg] | 0.214[cdefg] | 0.192[abc] |

TABLE 43-continued

Effect of propionibacteria on the glucose (g/100 g DM) content of ensiled high moisture corn during aerobic exposure

| Moisture level | Inoculant | Aerobic exposure (d) | | | |
|---|---|---|---|---|---|
| | | 0 | 1 | 3 | 5 |
| | Pioneer | 0.261[abcd] | 0.251[abcde] | 0.242[abcde] | 0.178[abcd] |
| | Media | 0.285[abc] | 0.252[abcde] | 0.221[bcdef] | 0.159[bcd] |
| | Control | 0.409[a] | 0.390[ab] | 0.391[a] | 0.313[ab] |
| | DH42 (A) | 0.362[ab] | 0.382[abc] | 0.357[abc] | 0.299[ab] |
| B | DH42 (B) | 0.397[ab] | 0.404[a] | 0.386[a] | 0.318[ab] |
| | Pioneer | 0.355[abc] | 0.366[abc] | 0.373[ab] | 0.303[ab] |
| | Media | 0.394[a] | 0.392[ab] | 0.381[a] | 0.342[a] |
| | Control | 0.191[cde] | 0.169[defg] | 0.164[defgh] | 0.117[cd] |
| | DH42 (A) | 0.197[cde] | 0.186[defg] | 0.153[defgh] | 0.129[cd] |
| C | DH42 (B) | 0.168[cdef] | 0.153[defgh] | 0.132[defghi] | 0.698[cd] |
| | Pioneer | 0.163[cdef] | 0.173[defg] | 0.143[defgh] | 0.148[cd] |
| | Media | 0.175[cdef] | 0.157[defgh] | 0.149[defgh] | 0.142[cd] |
| | Control | 0.054[efgh] | 0.041[fh] | 0.053[hi] | 0.049[cd] |
| | DH42 (A) | 0.050[defgh] | 0.054[fgh] | 0.066[ghi] | 0.051[cd] |
| D | DH42 (B) | 0.101[gh] | 0.077[efgh] | 0.097[efghi] | 0.071[cd] |
| | Pioneer | 0.029[h] | 0.022[h] | 0.024[i] | 0.019[d] |
| | Media | 0.087[defgh] | 0.064[fgh] | 0.070[fghi] | 0.047[cd] |
| | Control | 0.087[defgh] | 0.071[fgh] | 0.079[fghi] | 0.064[cd] |
| | DH42 (A) | 0.081[efgh] | 0.077[efgh] | 0.078[fghi] | 0.065[cd] |
| E | DH42 (B) | 0.060[fgh] | 0.059[fgh] | 0.072[fghi] | 0.065[cd] |
| | Pioneer | 0.103[defgh] | 0.078[efgh] | 0.096[efghi] | 0.067[cd] |
| | Media | 0.055[fgh] | 0.047[gh] | 0.046[hi] | 0.056[cd] |
| | Control | 0.058[efgh] | 0.049[gh] | 0.060[fghi] | 0.068[cd] |
| | DH42 (A) | 0.107[defgh] | 0.097[defgh] | 0.135[defghi] | 0.093[cd] |
| F | DH42 (B) | 0.085[efgh] | 0.051[gh] | 0.075[fgh] | 0.083[cd] |
| | Pioneer | 0.111[defgh] | 0.000[h] | 0.116[defghi] | 0.101[cd] |
| | Media | 0.054[efgh] | 0.000[h] | 0.000[i] | 0.002[d] |

Column means of different superscripts are significant (P < 0.01).

TABLE 44

Effect of propionibacteria on the ethanol (g/100 g DM) content of ensiled high moisture corn during aerobic exposure

| Moisture level | Inoculant | Aerobic exposure (d) | | | |
|---|---|---|---|---|---|
| | | 0 | 1 | 3 | 5 |
| | Control | 0.478[cdefg] | 0.458[efgh] | 0.695[a] | 0.000[e] |
| | DH42 (A) | 0.563[abcdefg] | 0.545[bcdefg] | 0.281[fg] | 0.058[e] |
| A | DH42 (B) | 0.516[bcdefg] | 0.477[defg] | 0.347[cdefg] | 0.021[e] |
| | Pioneer | 0.488[cdefg] | 0.480[defg] | 0.329[defg] | 0.024[e] |
| | Media | 0.505[bcdefg] | 0.355[efgh] | 0.321[efg] | 0.013[e] |
| | Control | 0.850[abc] | 0.809[ab] | 0.195[fg] | 0.345[ab] |
| | DH42 (A) | 0.877[ab] | 0.856[a] | 0.645[abcde] | 0.372[a] |
| B | DH42 (B) | 0.917[a] | 0.794[abc] | 0.667[abc] | 0.329[abc] |
| | Pioneer | 0.861[abc] | 0.790[abc] | 0.681[abc] | 0.323[abcd] |
| | Media | 0.858[abc] | 0.768[abcd] | 0.680[abc] | 0.331[abc] |
| | Control | 0.753[abcd] | 0.552[cdef] | 0.377[efg] | 0.136[de] |
| | DH42 (A) | 0.543[bcdef] | 0.387[efgh] | 0.366[fg] | 0.142[cde] |
| C | DH42 (B) | 0.490[defg] | 0.362[efgh] | 0.278[fg] | 0.108[e] |
| | Pioneer | 0.527[cdef] | 0.345[gh] | 0.342[fg] | 0.131[e] |
| | Media | 0.673[abcde] | 0.554[cdef] | 0.424[abcdef] | 0.128[e] |
| | Control | 0.415[defg] | 0.343[efgh] | 0.287[fg] | 0.127[bcde] |
| | DH42 (A) | 0.411[cdefg] | 0.384[efgh] | 0.321[fg] | 0.157[abcde] |
| D | DH42 (B) | 0.481[defg] | 0.386[efgh] | 0.335[efg] | 0.180[abcde] |
| | Pioneer | 0.324[fg] | 0.263[gh] | 0.242[fg] | 0.125[bcde] |
| | Media | 0.547[abcdefg] | 0.385[efgh] | 0.333[efg] | 0.148[bcde] |
| | Control | 0.153[g] | 0.255[gh] | 0.210[fg] | 0.088[e] |
| | DH42 (A) | 0.258[fg] | 0.163[h] | 0.145[g] | 0.052[e] |
| E | DH42 (B) | 0.343[efg] | 0.240[gh] | 0.167[fg] | 0.057[e] |
| | Pioneer | 0.260[fg] | 0.175[gh] | 0.169[fg] | 0.047[e] |
| | Media | 0.423[defg] | 0.304[gh] | 0.163[fg] | 0.107[de] |
| | Control | 0.556[abcdefg] | 0.330[efgh] | 0.216[fg] | 0.065[e] |
| | DH42 (A) | 0.439[cdefg] | 0.311[fgh] | 0.253[fg] | 0.124[bcde] |

TABLE 44-continued

Effect of propionibacteria on the ethanol (g/100 g DM) content of ensiled high moisture corn during aerobic exposure

| Moisture level | Inoculant | Aerobic exposure (d) | | | |
|---|---|---|---|---|---|
| | | 0 | 1 | 3 | 5 |
| F | DH42 (B) | 0.369[efg] | 0.263[gh] | 0.152[fg] | 0.077[e] |
| | Pioneer | 0.357[efg] | 0.274[gh] | 0.223[fg] | 0.096[cde] |
| | Media | 0.588[abcdef] | 0.368[efgh] | 0.227[fg] | 0.056[e] |

Column means of different superscripts are significant (P < 0.01).

TABLE 45

Effect of propionibacteria on the pH during the aerobic exposure of ensiled high moisture corn.

| Moisture level | Inoculant | Aerobic exposure (d) | | | |
|---|---|---|---|---|---|
| | | 0 | 1 | 3 | 5 |
| | Control | 3.70[h] | 3.69[k] | 4.82[a] | 5.15[ab] |
| | DH42 (A) | 3.73[h] | 3.72[k] | 3.72[b] | 5.00[ab] |
| A | DH42 (B) | 3.74[h] | 3.72[k] | 3.74[b] | 3.91[b] |
| | Pioneer | 3.72[h] | 3.71[k] | 3.75[b] | 4.82[ab] |
| | Media | 3.75[h] | 3.76[k] | 3.73[b] | 6.26[a] |
| | Control | 4.12[fg] | 4.14[ghij] | 4.13[ab] | 4.10[b] |
| | DH42 (A) | 4.10[fg] | 4.11[hij] | 4.10[ab] | 4.07[b] |
| B | DH42 (B) | 4.04[g] | 4.08[ij] | 4.05[ab] | 4.02[b] |
| | Pioneer | 4.02[g] | 4.03[j] | 4.02[ab] | 4.01[b] |
| | Media | 4.05[g] | 4.07[j] | 4.06[ab] | 4.01[b] |
| | Control | 4.24[def] | 4.24[efgh] | 4.27[ab] | 4.56[b] |
| | DH42 (A) | 4.18[defg] | 4.17[fghij] | 4.20[ab] | 4.20[b] |
| C | DH42 (B) | 4.14[fg] | 4.13[hij] | 4.16[ab] | 4.16[b] |
| | Pioneer | 4.16[efgh] | 4.17[fghij] | 4.19[ab] | 4.20[b] |
| | Media | 4.22[def] | 4.23[efghi] | 4.24[ab] | 4.37[b] |
| | Control | 4.43[bc] | 4.42[bcd] | 4.42[ab] | 4.44[b] |
| | DH42 (A) | 4.40[bc] | 4.40[bcd] | 4.39[ab] | 4.42[b] |
| D | DH42 (B) | 4.33[cd] | 4.33[cde] | 4.32[ab] | 4.35[b] |
| | Pioneer | 4.27[cdef] | 4.26[defgh] | 4.25[ab] | 4.29[b] |
| | Media | 4.40[bc] | 4.38[bcde] | 4.39[ab] | 4.41[b] |
| | Control | 4.27[cdef] | 4.26[defghi] | 4.28[ab] | 4.33[b] |
| | DH42 (A) | 4.33[cd] | 4.31[defg] | 4.34[ab] | 4.39[b] |
| E | DH42 (B) | 4.30[cde] | 4.30[defg] | 4.32[ab] | 4.38[b] |
| | Pioneer | 4.34[cd] | 4.33[cde] | 4.34[ab] | 4.39[b] |
| | Media | 4.31[cde] | 4.32[def] | 4.33[ab] | 4.39[b] |
| | Control | 4.67[a] | 4.66[a] | 4.66[ab] | 4.72[ab] |
| | DH42 (A) | 4.57[ab] | 4.55[ab] | 4.54[ab] | 4.56[ab] |
| F | DH42 (B) | 4.56[ab] | 4.57[ab] | 4.57[ab] | 4.59[ab] |
| | Pioneer | 4.55[ab] | 4.52[abc] | 4.53[ab] | 4.55[b] |
| | Media | 4.67[a] | 4.65[a] | 4.63[ab[001b]] | 4.70[ab] |

Column means of different superscripts are significant (P < 0.01)

TABLE 46

Effect of propionibacteria on the yeast and molds (log cfu/g DM) of ensiled high moisture corn during aerobic exposure

| Moisture level | Inoculant | Aerobic exposure (d) | | | |
|---|---|---|---|---|---|
| | | 0 | 1 | 3 | 5 |
| | Control | 3.20$^a$ | 3.29$^{abc}$ | 5.89$^{abc}$ | 7.95$^a$ |
| | DH42 (A) | 2.11$^a$ | 2.54$^{abc}$ | 5.63$^{abc}$ | 8.04$^a$ |
| A | DH42 (B) | 2.02$^a$ | 3.16$^{abc}$ | 5.85$^{abc}$ | 7.69$^a$ |
| | Pioneer | 2.98$^a$ | 3.35$^{ab}$ | 5.74$^{abc}$ | 7.60$^a$ |
| | Media | 3.13$^a$ | 4.21$^a$ | 6.50$^a$ | 7.89$^a$ |
| | Control | 0.00$^a$ | 0.00$^c$ | 0.74$^{def}$ | 0.82$^d$ |
| | DH42 (A) | 0.00$^a$ | 0.18$^{bc}$ | 0.88$^{def}$ | 0.00$^d$ |
| B | DH42 (B) | 0.00$^a$ | 0.00$^c$ | 0.50$^{def}$ | 0.00$^d$ |
| | Pioneer | 0.00$^a$ | 0.00$^c$ | 0.13$^f$ | 0.00$^d$ |
| | Media | 0.00$^a$ | 0.00$^c$ | 0.46$^{def}$ | 0.59$^d$ |
| | Control | 2.22$^a$ | 2.10$^{bc}$ | 2.33$^{cdef}$ | 1.84$^{bcd}$ |
| | DH42 (A) | 1.64$^a$ | 0.47$^{bc}$ | 0.21$^f$ | 1.61$^{bcd}$ |
| C | DH42 (B) | 0.85$^a$ | 0.65$^{bc}$ | 0.65$^{def}$ | 0.64$^d$ |
| | Pioneer | 1.01$^a$ | 0.70$^{bc}$ | 0.75$^{def}$ | 1.06$^{cd}$ |
| | Media | 1.72$^a$ | 0.41$^{bc}$ | 0.45$^{def}$ | 0.84$^d$ |
| | Control | 1.19$^a$ | 0.83$^{bc}$ | 0.50$^{def}$ | 0.71$^d$ |
| | DH42 (A) | 1.38$^a$ | 1.25$^{abc}$ | 1.11$^{def}$ | 1.33$^{bcd}$ |
| D | DH42 (B) | 0.00$^a$ | 0.00$^c$ | 0.09$^f$ | 0.47$^d$ |
| | Pioneer | 0.42$^a$ | 0.46$^{bc}$ | 1.02$^{def}$ | 0.76$^d$ |
| | Media | 0.00$^a$ | 0.16$^{bc}$ | 0.16$^f$ | 0.63$^d$ |
| | Control | 2.46$^a$ | 2.69$^{abc}$ | 3.25$^{bcde}$ | 3.55$^{bc}$ |
| | DH42 (A) | 1.72$^a$ | 1.32$^{abc}$ | 1.88$^{cdef}$ | 1.91$^{bcd}$ |
| E | DH42 (B) | 0.38$^a$ | 0.13$^{bc}$ | 1.49$^{def}$ | 0.88$^{cd}$ |
| | Pioneer | 0.79$^a$ | 0.00$^c$ | 0.84$^{def}$ | 1.46$^{bcd}$ |
| | Media | 1.44$^a$ | 0.39$^{bc}$ | 0.36$^{ef}$ | 0.26$^d$ |
| | Control | 2.91$^a$ | 2.97$^{abc}$ | 3.41$^{bcd}$ | 3.95$^b$ |
| | DH42 (A) | 1.16$^a$ | 0.85$^{bc}$ | 1.97$^{cdef}$ | 1.77$^{bcd}$ |
| F | DH42 (B) | 0.00$^a$ | 0.00$^c$ | 1.73$^{cdef}$ | 1.01$^{cd}$ |
| | Pioneer | 0.88$^a$ | 0.02$^{bc}$ | 1.20$^{def}$ | 1.56$^{bcd}$ |
| | Media | 1.71$^a$ | 0.63$^{bc}$ | 1.06$^{def}$ | 0.85$^{cd}$ |

Column means of different superscripts are significant (P < 0.01)

TABLE 47

Average yeast and mold counts (log cfu/g DM) of ensiled high moisture corn during aerobic exposure.

| Inoculant | Aerobic Exposure (d) | | | |
|---|---|---|---|---|
| | 0 | 1 | 3 | 5 |
| Control | 1.92$^b$ | 2.02$^b$ | 2.72$^b$ | 3.16$^b$ |
| DH42 (A) | 1.33$^a$ | 1.15$^{ab}$ | 1.99$^{ab}$ | 2.45$^a$ |
| DH42 (B) | 0.53$^a$ | 0.62$^a$ | 1.79$^{ab}$ | 1.83$^a$ |
| Pioneer | 1.00$^{ab}$ | 0.85$^a$ | 1.68$^a$ | 2.09$^a$ |
| Media | 1.14$^a$ | 1.03$^{ab}$ | 1.60$^a$ | 1.92$^a$ |

Column means of different superscripts are significant (P < 0.01).

TABLE 48

Effect of propionibacteria on the temperature (° F.) of ensiled high moisture corn during aerobic exposure

| Moisture level | Inoculant | Aerobic exposure (d) | | | | | |
|---|---|---|---|---|---|---|---|
| | | 0 | 1 | 2 | 3 | 4 | 5 |
| A | Control | 65.33$^{hi}$ | 67.17$^d$ | 66.00$^a$ | 67.33$^{ef}$ | 71.00$^{abcd}$ | 82.33$^a$ |
| | DH42 (A) | 64.00$^i$ | 68.83$^d$ | 65.33$^a$ | 64.00$^f$ | 69.33$^{abcd}$ | 77.00$^{abc}$ |
| | DH42 (B) | 66.00$^{fghi}$ | 67.33$^d$ | 66.67$^a$ | 65.00$^{ef}$ | 66.67$^{cd}$ | 77.50$^{abc}$ |
| | Pioneer | 65.67$^{ghi}$ | 67.00$^d$ | 67.17$^a$ | 65.67$^{ef}$ | 75.00$^{abcd}$ | 75.17$^{abcde}$ |
| | Media | 66.33$^{efghi}$ | 73.17$^{abcd}$ | 70.83$^a$ | 67.33$^{ef}$ | 79.67$^{abcd}$ | 78.00$^{ab}$ |
| B | Control | 71.25$^{bcde}$ | 68.38$^d$ | 67.13$^a$ | 67.38$^{ef}$ | 67.63$^{bcd}$ | 68.50$^{ef}$ |
| | DH42 (A) | 70.75$^{cdef}$ | 68.00$^d$ | 66.75$^a$ | 67.00$^{ef}$ | 67.13$^{cd}$ | 68.00$^{ef}$ |
| | DH42 (B) | 71.50$^{bcd}$ | 68.75$^d$ | 67.50$^a$ | 67.63$^{ef}$ | 67.75$^{abcd}$ | 68.25$^{ef}$ |
| | Pioneer | 71.00$^{cdef}$ | 68.25$^d$ | 67.13$^a$ | 64.38$^{ef}$ | 67.00$^{cd}$ | 68.25$^{ef}$ |
| | Media | 70.00$^{defgh}$ | 67.00$^d$ | 65.88$^a$ | 65.63$^{ef}$ | 66.38$^d$ | 67.25$^f$ |
| C | Control | 76.00$^a$ | 76.69$^{ab}$ | 73.38$^a$ | 75.88$^a$ | 79.25$^a$ | 80.63$^a$ |
| | DH42 (A) | 75.25$^{ab}$ | 75.81$^{abc}$ | 72.75$^a$ | 74.00$^{abcd}$ | 78.25$^{abc}$ | 78.25$^a$ |
| | DH42 (B) | 76.13$^a$ | 76.75$^{ab}$ | 73.13$^a$ | 74.94$^{abc}$ | 78.50$^{abc}$ | 78.88$^a$ |
| | Pioneer | 76.38$^a$ | 76.75$^{ab}$ | 73.13$^a$ | 75.25$^{ab}$ | 78.75$^a$ | 79.13$^a$ |
| | Media | 76.25$^a$ | 76.94$^a$ | 73.25$^a$ | 75.31$^{ab}$ | 79.00$^{ab}$ | 79.88$^a$ |
| D | Control | 75.00$^{abc}$ | 69.38$^d$ | 69.00$^a$ | 69.38$^{def}$ | 69.00$^{abcd}$ | 70.50$^{bcdef}$ |
| | DH42 (A) | 73.50$^{abcd}$ | 69.50$^d$ | 69.25$^a$ | 69.00$^{ef}$ | 68.25$^{abcd}$ | 69.75$^{def}$ |
| | DH42 (B) | 73.75$^{abcd}$ | 69.00$^d$ | 68.75$^a$ | 69.25$^{def}$ | 69.00$^{abcd}$ | 70.50$^{bcdef}$ |
| | Pioneer | 74.25$^{abcd}$ | 69.50$^d$ | 69.25$^a$ | 69.25$^{def}$ | 68.75$^{abcd}$ | 70.00$^{cdef}$ |
| | Media | 73.75$^{abcd}$ | 69.63$^d$ | 68.75$^a$ | 69.50$^{def}$ | 69.00$^{abcd}$ | 70.50$^{bcdef}$ |
| E | Control | 70.25$^{defgh}$ | 69.38$^d$ | 68.88$^a$ | 67.50$^{ef}$ | 67.50$^{bcd}$ | 68.75$^{ef}$ |
| | DH42 (A) | 70.00$^{defgh}$ | 68.75$^d$ | 69.13$^a$ | 67.50$^{ef}$ | 67.00$^{cd}$ | 67.25$^f$ |
| | DH42 (B) | 70.25$^{defgh}$ | 70.00$^{cd}$ | 69.25$^a$ | 68.75$^{ef}$ | 68.00$^{abcd}$ | 68.50$^{ef}$ |
| | Pioneer | 71.00$^{cdef}$ | 70.75$^{cd}$ | 70.88$^a$ | 69.00$^{ef}$ | 69.75$^{abcd}$ | 70.00$^{cdef}$ |
| | Media | 70.75$^{cdef}$ | 70.13$^{cd}$ | 70.38$^a$ | 69.00$^{ef}$ | 69.00$^{abcd}$ | 68.75$^{ef}$ |
| F | Control | 71.00$^{cdefgh}$ | 70.67$^{bcd}$ | 71.67$^a$ | 69.83$^{cdef}$ | 71.00$^{abcd}$ | 70.33$^{bcdef}$ |
| | DH42 (A) | 71.00$^{cdefg}$ | 71.00$^{abcd}$ | 72.00$^a$ | 70.17$^{bcdef}$ | 70.67$^{abcd}$ | 70.67$^{bcdef}$ |
| | DH42 (B) | 70.67$^{cdefgh}$ | 69.83$^{cd}$ | 70.67$^a$ | 69.33$^{def}$ | 70.33$^{abcd}$ | 69.00$^{def}$ |
| | Pioneer | 71.33$^{bcdef}$ | 71.50$^{abcd}$ | 71.33$^a$ | 70.83$^{abcd}$ | 70.67$^{abcd}$ | 70.00$^{cdef}$ |
| | Media | 72.00$^{abcd}$ | 71.33$^{abcd}$ | 72.00$^a$ | 69.50$^{def}$ | 70.67$^{abcd}$ | 69.67$^{cdef}$ |

Column means of different superscripts are significant (P < 0.01).

EXAMPLE 4

In this Example the results of feeding trials in beef cattle is shown. There is a significant increase in efficiency.

TABLE 49

Effects of DH42 on weight gain and dry matter intake of growing-finishing steers

|  | No. of Pens | ADG[1] | DMI[2] | Gain/feed[3] |
|---|---|---|---|---|
| 1994[4] | | | | |
| Control | 6 | 2.57 | 20.06 | .128 |
| Treated | 6 | 2.84 | 20.95 | .136 |
| SEM | | .14 | .20 | .007 |
| Probability | | .18 | .01 | .45 |
| 1995[5] | | | | |
| Control | 10 | 2.92 | 21.44 | .137 |
| Treated | 10 | 3.02 | 21.34 | .142 |
| SEM | | .07 | .54 | .003 |
| Probability | | .28 | .89 | .16 |

[1] Average daily gain.
[2] Dry matter intake.
[3] Efficiency = $\frac{ADG}{DMI}$
[4] Ensiled 56 days
[5] Ensiled 100 days

TABLE 50

Growth and intake of steers fed DH42 treated corn[1]. Study 1996.

|  | Control | DH42 | SEM | Probability |
|---|---|---|---|---|
| No. of pens | | | | |
| Weight, lb | | | | |
| Initial | 809.8 | 810.5 | .63 | .44 |
| Final | 1195.2 | 1211.8 | 9.7 | .26 |
| ADG, lb | | | | |
| 0.28 | 4.12 | 4.06 | .17 | .83 |
| 29–55 | 2.65 | 2.43 | .28 | .59 |
| 56.89 | 3.31[a] | 3.75[b] | .12 | .02 |
| 86–124 | 2.47[a] | 2.77[b] | .07 | .02 |
| 0–124 | 2.92 | 3.02 | .07 | .28 |
| DMI, lb/d | | | | |
| 0–28 | 20.61 | 19.56 | .51 | .17 |
| 29–55 | 22.10 | 19.66 | .77 | .05 |
| 56–85 | 21.01 | 23.36 | .70 | .04 |
| 86–124 | 22.10 | 22.69 | .53 | .45 |
| 0–124 | 21.44 | 21.34 | .54 | .89 |

[1] Ensiled 120 days

TABLE 51

|  | Control | DH42 | SEM | Probability |
|---|---|---|---|---|
| Gain/Feed, lb/1000 lb[1] | | | | |
| 0–28 | 200.8 | 206.8 | 8.6 | |
| 29–55 | 119.4 | 120.4 | 11.5 | .95 |
| 56–85 | 158.2 | 161.6 | 8.5 | .78 |
| 86–124 | 112.3 | 122.5 | 4.1 | .11 |
| 0–124 | 136.5 | 142.4 | 2.8 | .16 |

[1] Efficiency – ratio of $\frac{ADG}{DMI}$

EXAMPLE 5

Materials and Methods

A feedout trial was conducted with 60 lactating dairy cows by Dr. Joe Harrison at Washington Sate University with an inoculant of the present invention (90k propionibacteria (DH42 and P42 as a 50:50 blend) and 10% lactic acid bacterium (*Lactobacillus plantarum* and *Pediococcus acidilactici* by cell count). They were fed total-mixed rations via Calan headgates. The TMR consisted of about 400 whole-plant corn silage which was ensiled either (1) untreated or treated (2) with a standard lactic acid bacteria inoculant or (3) a combination of lactic acid bacteria and propionic acid bacteria inoculant. Each inoculant was applied at 100,000 CFU per gram of wet forage. The experimental silages were harvested at approximately 35% dry matter and ensiled in alternate loads in two 75 ton bunker silos for each treatment for 60 days.

Twenty (20) cows were assigned per treatment in a continuous design lactation study. All treatment groups were balanced for parity and genetic merit rating (PTA). PTA served as a co-variate adjustment factor. All cows were started on treatment at calving and continued through week 13 of lactation. Daily feed intake, milk production and composition were determined on each cow. Aerobic stability of all experimental silages was also evaluated when each bunker was opened. Styrofoam coolers were used for this study. Increases in temperature were monitored via temperature probes which were inserted into the silage material. Another set of samples were analyzed for pH, counts of mold and yeast, lactic acid bacteria, bacilli, concentrations of ethanol, lactic acid, acetic acid, and propionic acid, each over a 5-day, aerobic, exposure period.

The data shows that the combination product of lactic and propionic acid producing bacteria performed well during the ensiling process. During aerobic feedout, the pH was even lower after 7 days of aerobic exposure. The inoculant even reduced some of the bacilli growth which are known to cause a slimy spoilage in some air pockets in the ensiled material. These are known to be proteolytic and cause some major protein degradation and loss of nitrogen. Yeast counts were controlled over at least 3 days and kept to a manageable number (10,000 CFU/g of forage) compared to 100,000,000 CFU/g of forage in the untreated control. As a result of lower counts of spoilage organisms, excessive heating was prevented, nutrient losses were lower and DM recovery was greater in inoculant treated silage.

The 60-day ensiled corn silages were then fed to lactating dairy cows. The results are shown in Table 52.

TABLE 52

| Parameter | Control | Lab Inoculant | DH42-P42 Inoculant |
|---|---|---|---|
| Cow No. | 20 | 20 | 20 |
| Length of trial, weeks | 13 | 13 | 13 |
| Milk, kg/d | 35.3 | 36.1 | 37.0 |
| Fat, % | 4.2[a] | 3.8[b] | 3.9[b] |
| Protein, % | 3.2[c] | 3.0[d] | 3.1[d] |

Mil k fat percent was somewhat reduced, which indicated that the propionate/acetate ratio had been changed.

Those cows that received the ration with the inoculant treated corn silage produced 1.7 kg more milk per head per day than the cows on the untreated ration and 0.9 kg per head per day more than the group on the standard lactic acid bacteria product. This increase was certainly a result from the reduction in spoilage organisms, the greater DM recovered, but may also be due to a direct probiotic effect in the rumen. The latter effect will still need to be substantiated through research trials.

This could mean a net additional income of approx. $16,000 per year for a 100-cow herd.

It is intended that the foregoing description be only illustrative of the present invention and that the present invention be limited only by the hereinafter appended claims.

We claim:

1. A method for increasing weight gain of beef cattle or increasing milk production of dairy cattle which comprises:
   (a) inoculating silage with an ensiling number of viable cells of Propionibacterium acidipropionici DH42, deposited as ATCC 55737 so that the silage stored in a silo is ensiled by producing propionic acid produced by DH42 which inhibits yeast and mold growth;
   (b) removing the ensiled silage from the silo so that the silage is exposed to air; and
   (c) feeding the ensiled silage containing the DH42 to the cattle so that the beef cattle have an increased weight gain or the dairy cattle have increased milk production, wherein the DH42 produces propionic acid produced by the DH42 and inhibits yeast and mold in the ensiled silage for at least five (5) days upon exposure to air.

2. The method of claim 1 wherein the DH42 is suspended in an aqueous medium for the inoculating.

3. The method of claim 1 wherein the DH42 is deposited on a solid carrier for the inoculating.

4. The method of any one of claims 1, 2 or 3, wherein the number of DH42 is between about $10^4$ and $10^{14}$ of the viable cells per gram of the silage.

5. The method of claim 1 wherein a lactic acid producing bacterium is inoculated into the silage along with the DH42.

6. A method for increasing weight gain of beef cattle or increasing milk production of dairy cattle which comprises:
   (a) inoculating high-moisture corn (HMC) containing between about 24% to 75% by weight moisture with an ensiling number of viable cells of *Propionibacterium acidipropionici* DH42 deposited as ATCC 55737, wherein the ensiled HMC contains at least about 0.3 g of propionic acid per 100 g of dry matter under anaerobic conditions as a result of storage in a silo, wherein the propionic acid from the DH42 inhibits mold and yeast growth in the HMC;
   (b) removing the ensiled HMC from the silo; and
   (c) feeding the ensiled HMC containing the DH42 to the cattle so that the beef cattle have an increased weight gain or the dairy cattle have increased milk production, wherein the propionic acid produced by the DH42 and inhibits yeast and mold in the ensiled HMC for at least five (5) days upon exposure to air.

7. The method of claim 6 wherein the DH42 is suspended in an aqueous medium for the inoculating.

8. The method of claim 6 wherein the DH42 is deposited on a solid carrier for the inoculating.

9. The method of any one of claims 6, 7 or 8 wherein the number of DH42 is between about $10^4$ and $10^{14}$ of the viable cells per gram of the HMC.

10. The method of any one of claims 1, 2, 3 or 5 wherein the cattle are dairy cattle.

11. The method of any one of claims 1, 2, 3 or 5 wherein the cattle are beef cattle.

12. The method of any one of claims 6, 7 or 8 wherein the cattle are dairy cattle.

13. The method of any one of claims 6, 7 or 8 wherein the cattle are beef cattle.

* * * * *

UNITED STATES PATENT AND TRADEMARK OFFICE
CERTIFICATE OF CORRECTION

PATENT NO. : 6,054,148
DATED : April 25, 2000
INVENTOR(S) : Steven R. Rust, Melvin T. Yokoyama and Tadd E. Dawson It is certified that error appears in the above-identified patent and that said Letters Patent is hereby corrected as shown below:

Column 1,
Line 20, "is" after "(1988):" and before "and" should be deleted.
Line 51, "Dyring" should be -- Drying --.

Column 3,
Line 22, "abut" should be -- about --.

Column 6,
Line 13, "$Y_{ijk}=\mu+T_j+D_j$" should be -- $Y_{ijk}=\mu+T_iD_j$ --.
Line 9 of Table 1, (9th column) "1.01" should be -- 0.01 --.

Column 9,
Line 38, "recover" should be -- recovery --.
Line 42, "$98.6^a$" should be -- $98.6^b$ --.

Column 10,
Line 48, "P. Acidpropionici" should be -- P. Acidipropionici --.

Column 12,
Line 30, "P acidipropionici D42" should be -- P. Acidipropoionici DH 42 --.

Column 13,
Line 58, "1K peptone" should be -- 1% peptone --.
Line 60, "(BEL)" should be -- (BBL) --.

Column 16,
Line 13, "Table 13" should be -- Table 11 --.

UNITED STATES PATENT AND TRADEMARK OFFICE
CERTIFICATE OF CORRECTION

PATENT NO.   : 6,054,148
DATED        : April 25, 2000
INVENTOR(S)  : Steven R. Rust, Melvin T. Yokoyama and Tadd E. Dawson It is certified that error appears in the above-identified patent and that said Letters Patent is hereby corrected as shown below:

Column 22,
Line 13, row 3 of Table 25, "P42 16 8 5b" should be -- P42 16 8 $5^b$ --.
Line 36, "P42 + LA8" should be -- P42 + LAB --.

Column 24,
Line 65, "B(67-06%)" should be -- B(67.06%) --.
Line 66, "E (76.89%) and E (78.07%)" should be -- E (76.89%) and F (78.07%) --.

Column 26,
Line 40, "$0.047^d$" should be -- $0.047^{ab}$ --.

Column 27,
Line 9, "$0.169^{bcd}$" should be -- $0.169^{abcd}$ --.
Line 56, "$0.626^{ddefg}$" should be -- $0.626^{defg}$ --.

Column 29,
Line 14, "$0.545^{abcdefghi}$" should be -- $0.545^{abcdefgh}$ --.
Table 36, under column "O", superscript "hi" should be added for Moisture Level B - Control and Pioneer; Moisture Level D - DH42 (A); DH42 (B); Pioneer; and Media.
Line 55, "$4.46^{bc}$" should be -- $4.49^{bc}$ --.
Line 56, "$5.36^{abcdefghi}$" should be -- $5.36^{bcdefghi}$ --.

Column 31,
Line 62, "$0.259^{bcdeghi}$" should be -- $0.259^{abcdehi}$ --.

UNITED STATES PATENT AND TRADEMARK OFFICE
CERTIFICATE OF CORRECTION

PATENT NO. : 6,054,148
DATED : April 25, 2000
INVENTOR(S) : Steven R. Rust, Melvin T. Yokoyama and Tadd E. Dawson It is certified that error appears in the above-identified patent and that said Letters Patent is hereby corrected as shown below:

Column 34,
Line 64, "$4.63^{ab[001b]}$" should be -- $4.63^{ab}$ --.

Column 35,
Line 17, "$2.10^{bc}$" should be -- $2.10^{abc}$ --.

Column 36,
Line 59, "$71.00^{cdefgh}$" should be -- $71.00^{cdefg}$ --.

Column 37,
Line 41, "56.89" should be -- 56-85 --.

Column 38,
Line 4, "Washington State" should be -- Washington State --.
Line 5, "(90K" should be -- (90% --.

Signed and Sealed this

Twenty-eighth Day of August, 2001

Attest:

Nicholas P. Godici

NICHOLAS P. GODICI
*Attesting Officer*   *Acting Director of the United States Patent and Trademark Office*